(12) United States Patent
Madhavan et al.

(10) Patent No.: US 8,645,242 B1
(45) Date of Patent: Feb. 4, 2014

(54) SYSTEMS AND METHODS FOR COMPILING AND ANALYZING BIDS IN AN AUCTION OF SECURITIES

(75) Inventors: Raghavachari K. Madhavan, New York, NY (US); Russell E. (Ben) Johnson-Laird, New York, NY (US)

(73) Assignee: Morgan Stanley, New York, NY (US)

( * ) Notice: Subject to any disclaimer, the term of this patent is extended or adjusted under 35 U.S.C. 154(b) by 825 days.

(21) Appl. No.: 11/126,893

(22) Filed: May 11, 2005

(51) Int. Cl.
  *G06Q 30/08* (2012.01)
(52) U.S. Cl.
  USPC .......................................................... 705/35
(58) Field of Classification Search
  USPC .......................................... 705/35, 10, 79, 34
  See application file for complete search history.

(56) References Cited

U.S. PATENT DOCUMENTS

| | | | |
|---|---|---|---|
| 5,297,032 A * | 3/1994 | Trojan et al. ...................... | 705/37 |
| 5,497,317 A * | 3/1996 | Hawkins et al. ................. | 705/37 |
| 6,629,082 B1 | 9/2003 | Hambrecht et al. | |
| 6,754,802 B1 * | 6/2004 | Kirsch ............................. | 712/14 |
| 6,980,999 B1 * | 12/2005 | Grana ............................. | 707/803 |
| 7,051,155 B2 * | 5/2006 | Talagala et al. ................ | 711/114 |
| 7,200,604 B2 * | 4/2007 | Forman et al. ................. | 707/692 |
| 7,308,428 B1 * | 12/2007 | Federspiel et al. ........... | 705/36 R |
| 7,403,911 B2 * | 7/2008 | Guler et al. ...................... | 705/10 |
| 7,415,436 B1 * | 8/2008 | Evelyn et al. .................... | 705/37 |
| 7,650,331 B1 | 1/2010 | Dean et al. | |
| 7,680,723 B2 * | 3/2010 | Friesen et al. .................. | 705/37 |
| 2001/0034692 A1 | 10/2001 | McRedmond | |
| 2002/0023041 A1 * | 2/2002 | Brett .............................. | 705/37 |
| 2002/0032701 A1 * | 3/2002 | Gao et al. ....................... | 707/513 |
| 2002/0035534 A1 | 3/2002 | Buist et al. | |
| 2002/0052827 A1 * | 5/2002 | Waelbroeck et al. ........... | 705/37 |
| 2002/0059130 A1 * | 5/2002 | Cheng et al. ..................... | 705/37 |
| 2002/0169711 A1 | 11/2002 | Ginsberg et al. | |
| 2002/0178104 A1 * | 11/2002 | Hausman ......................... | 705/37 |
| 2004/0015415 A1 * | 1/2004 | Cofino et al. ................... | 705/26 |
| 2004/0039685 A1 | 2/2004 | Hambrecht et al. | |
| 2004/0049732 A1 * | 3/2004 | Wicks ........................... | 715/509 |
| 2004/0107154 A1 * | 6/2004 | Nishimaki ...................... | 705/36 |
| 2004/0133503 A1 * | 7/2004 | Podsiadlo ........................ | 705/37 |
| 2004/0220887 A1 * | 11/2004 | Byde et al. ..................... | 705/400 |
| 2004/0267611 A1 * | 12/2004 | Hoerenz .......................... | 705/14 |

(Continued)

OTHER PUBLICATIONS

"Gradesheet.com's StudentInfo Utility" 3 pages at gradesheet.com/download/pws_readme.txt : Jan. 20, 2004.*

(Continued)

*Primary Examiner* — Ella Colbert
*Assistant Examiner* — Mary Gregg
(74) *Attorney, Agent, or Firm* — K&L Gates LLP

(57) ABSTRACT

Systems and methods for compiling and analyzing bids from bidders in an auction offering of securities by an issuing company are disclosed. A data striper stripes bid data compiled from the bids of potential investors into a plurality of stripes according to an algorithm and a bid aggregation system aggregates the bid data in the stripes. The bid aggregation system may perform a first-level aggregation on the bid data in the data stripes for combinations of a plurality of attributes related to the bid data and/or a second-level aggregation based on the first-level aggregation. The auction management system may further comprise an analytics system for analyzing the aggregated bid data. The analytics system may receive user requests for analysis of the bid data, perform the analysis in real time based on the user inputs, and serve the results of the analysis to the user.

96 Claims, 17 Drawing Sheets

(56) References Cited

U.S. PATENT DOCUMENTS

| | | | |
|---|---|---|---|
| 2005/0033928 A1* | 2/2005 | Hook | 711/148 |
| 2005/0044032 A1* | 2/2005 | Lee et al. | 705/37 |
| 2005/0075965 A1* | 4/2005 | Cutler | 705/37 |
| 2005/0080707 A1* | 4/2005 | Glasspool | 705/37 |
| 2005/0119966 A1* | 6/2005 | Sandholm et al. | 705/37 |
| 2005/0125330 A1* | 6/2005 | Dinwoodie | 705/37 |
| 2005/0171893 A1* | 8/2005 | Gaer | 705/37 |
| 2005/0273416 A1* | 12/2005 | Tanzer | 705/37 |
| 2006/0167703 A1* | 7/2006 | Yakov | 705/1 |
| 2006/0248273 A1* | 11/2006 | Jernigan et al. | 711/114 |
| 2007/0124229 A1* | 5/2007 | Ku et al. | 705/37 |
| 2010/0076887 A1* | 3/2010 | Cushing | 705/37 |
| 2010/0121782 A1* | 5/2010 | Noser et al. | 705/36 R |
| 2010/0223200 A1* | 9/2010 | Balson et al. | 705/36 R |

OTHER PUBLICATIONS

Why do sellers at auctions bid for their own items, Theory or evidence by Beckman; Schmalenbach Business Review; vol. 56, Oct. 2004; pp. 312-337.*

Dean, Jeffrey and Sanjay Ghemawat, "MapReduce: Simplified Data Processing on Large Clusters", OSDI'04: Sixth Symposium on Operating System Design and Implementation, San Francisco, CA, Dec. 2004, 13 pages.

* cited by examiner

| | Syndicate Member | ALL ▼ | | | Investor Type | ALL ▼ | | | | | | | Roadshow | ALL ▼ | |
|---|---|---|---|---|---|---|---|---|---|---|---|---|---|---|---|
| | | | | | | MASTER ORDER BOOK | | | | | | | | | |
| Tax ID | Investor Name | Investor Type | Roadshow | Syndicate Member | # of Syndicate Members | Total # of Bids | Max Exposure ($) (000) | Max Bid ($) | Max Bid Shares | Min Bid ($) | Min Bid Shares | # of Successful Bids | # of Successful Shares | Allocation | Total ($) (000) Value |
| IN 2211136-1 | CSI-7-2465 | Inst. | 1:1 | CSI | 1 | 4 | 28,182.89 | 105.32 | 94,248 | 91.41 | 93,317 | 4 | 308,313 | 107,514 | 9,247.27 |
| IN29820184-1 | CSI-7-2462 | Inst. | 1:1 | CSI | 1 | 4 | 26,633.14 | 111.92 | 89,073 | 90.01 | 64,933 | 4 | 295,891 | 107,514 | 9,247.27 |
| IN16813587-1 | CSI-7-2190 | Inst. | 1:1 | CSI | 1 | 4 | 21,447.98 | 109.94 | 83,911 | 94.24 | 34,094 | 4 | 227,589 | 107,514 | 9,247.27 |
| IN6765898-1 | CSI-7-2328 | Inst. | 1:1 | CSI | 1 | 2 | 20,591.86 | 116.34 | 96,732 | 106.20 | 97,165 | 2 | 193,897 | 107,514 | 9,247.27 |
| IN2555057-1 | CSI-7-2487 | Inst. | 1:1 | CSI | 1 | 2 | 20,432.57 | 115.29 | 83,044 | 112.27 | 98,951 | 2 | 181,995 | 107,514 | 9,247.36 |
| IN21509109-1 | CSI-7-2356 | Inst. | 1:1 | CSI | 1 | 2 | 20,230.89 | 116.94 | 92,774 | 116.12 | 81,450 | 2 | 174,224 | 107,514 | 9,247.27 |
| IN24201384-1 | CSI-7-2044 | Inst. | 1:1 | CSI | 1 | 2 | 20,171.39 | 116.47 | 85,979 | 110.83 | 96,024 | 2 | 182,003 | 107,514 | 9247.27 |
| IN141869-1 | CSI-7-2266 | Inst. | 1:1 | CSI | 1 | 2 | 20,156.26 | 116.43 | 91,990 | 110.68 | 90,123 | 2 | 182,113 | 107,514 | 9,247.27 |
| IN16986750-1 | CSI-7-2095 | Inst. | 1:1 | CSI | 1 | 2 | 20,025.94 | 116.85 | 99,063 | 108.46 | 85,576 | 2 | 184,639 | 107,514 | 9,247.27 |
| IN19330788-1 | CSI-7-2366 | Inst. | 1:1 | CSI | 1 | 2 | 19,684.95 | 123.93 | 94,223 | 108.29 | 87,557 | 2 | 181,780 | 107,514 | 9,247.27 |
| IN22202471-1 | CSI-7-2447 | Inst. | 1:1 | CSI | 1 | 2 | 19,664.70 | 122.11 | 95,977 | 107.36 | 87,189 | 2 | 183,166 | 107,514 | 9,247.27 |
| IN16401824-1 | CSI-7-2233 | Inst. | 1:1 | CSI | 1 | 2 | 19,631.06 | 114.53 | 86,176 | 111.93 | 89,211 | 2 | 175,387 | 107,514 | 9,247.27 |
| IN21568665-1 | CSI-7-2399 | Inst. | 1:1 | CSI | 1 | 2 | 19,566.30 | 119.84 | 90,745 | 111.20 | 85,211 | 2 | 175,956 | 107,514 | 9,247.27 |
| IN29412645-1 | CSI-7-2166 | Inst | 1:1 | CSI | 1 | 2 | 19,457.03 | 116.48 | 80,844 | 115.29 | 87,922 | 2 | 168,766 | 107,514 | 9,247.27 |
| IN10751166-1 | CSI-7-2162 | Inst. | 1:1 | CSI | 1 | 2 | 19,303.98 | 114.95 | 89,755 | 109.17 | 87,070 | 2 | 176,825 | 107,514 | 9,247.27 |
| IN27652592-1 | CSI-7-2320 | Inst. | 1:1 | CSI | 1 | 2 | 19,287.80 | 105.46 | 93,834 | 102.04 | 95,188 | 2 | 189,022 | 107,514 | 9,247.27 |
| IN14449703-1 | CSI-7-2092 | Inst. | 1:1 | CSI | 1 | 2 | 19,056.15 | 119.27 | 91,722 | 103.37 | 92,627 | 2 | 184,349 | 107,514 | 9,247.27 |

Fig. 9

| Bid | Time Stamp | Syndicate Member | Bid Price ($) | Share Amt. | Value ($) (000) |
|---|---|---|---|---|---|
| | | | Investor Name CSI-7-2465 Investor Type: Inst Roadshow 1:1 | | |
| 1 | T1 | CSI | 105.32 | 94,248 | 9926.20 |
| 2 | T2 | CSI | 101.00 | 42,802 | 4323.00 |
| 3 | T3 | CSI | 95.00 | 56,880 | 5403.58 |
| 4 | T4 | CSI | 91.41 | 93,317 | 8530.11 |

Fig. 10

| Sweep: | 8/13/2004 (1) ▼ | Price Range ($): | Low: 0.00 | High: 125.00 | | | | | | | | | | |
|---|---|---|---|---|---|---|---|---|---|---|---|---|---|---|
| Price Increment(cents): | 100 ▼ | | Please ensure the Price Range is between $0.00 and $125.00 | | | | | | | | | | | |
| * If the exact price points requested are not available, the closest price points above those will be returned. | | | | | | | | | | | | | | |

Demand Breakdown By Price

| | Total # of Shares Demand | | | | | Number of Bids | | | | | Shares | | | |
|---|---|---|---|---|---|---|---|---|---|---|---|---|---|---|
| Price ($) | Inst. 111 | Inst. Group | Inst. DNP | Retail | Total | Inst. 111 | Inst. Group | Inst. DNP | Retail | Total | % Inst. 111 | % Inst. Group | % Inst. DNP | % Retail |
| 125.00 | - | - | - | 12,854 | 32,518 | - | - | - | 2 | 3 | - | 60.47 | - | 39.53 |
| 124.00 | 1,022,647 | 19,664 | - | 12,854 | 32,518 | - | - | - | 2 | 3 | - | 60.47 | - | 39.53 |
| 124.00 | 1,022,647 | 19,664 | 49,210 | 381,702 | 2,231,934 | 17 | 73 | 9 | 143 | 242 | 45.82 | 34.87 | 2.20 | 17.10 |
| 123.00 | 2,702,224 | 778,375 | 114,778 | 759,423 | 5,299,712 | 47 | 162 | 21 | 268 | 498 | 50.99 | 32.52 | 2.17 | 14.33 |
| 122.00 | 4,478,897 | 1,723,287 | 178,252 | 1,089,115 | 8,457,746 | 76 | 237 | 30 | 385 | 748 | 52.96 | 32.07 | 2.11 | 12.87 |
| 121.00 | 6,570,684 | 2,712,482 | 233,914 | 1,433,559 | 11,690,285 | 112 | 329 | 40 | 509 | 990 | 56.21 | 29.36 | 2.00 | 12.43 |
| 120.00 | 8,014,999 | 3,432,128 | 258,459 | 1,894,682 | 14,357,817 | 139 | 410 | 45 | 632 | 1,246 | 55.82 | 29.18 | 1.80 | 13.20 |
| 119.00 | 9,476,961 | 4,189,677 | 320,196 | 2,261,464 | 17,001,409 | 161 | 485 | 55 | 781 | 1,482 | 55.74 | 29.07 | 1.88 | 13.30 |
| 118.01 | 10,891,081 | 4,942,788 | 382,964 | 2,594,576 | 19,619,785 | 188 | 562 | 68 | 908 | 1,726 | 55.51 | 29.31 | 1.95 | 13.22 |
| 117.01 | 12,247,991 | 5,751,164 | 471,328 | 2,954,147 | 22,237,018 | 211 | 635 | 81 | 1,027 | 1,954 | 55.08 | 29.52 | 2.12 | 13.28 |
| 116.00 | 14,582,091 | 6,563,552 | 537,703 | 3,287,066 | 25,693,526 | 246 | 709 | 91 | 1,137 | 2,203 | 56.75 | 28.36 | 2.09 | 12.79 |
| 115.00 | 16,205,938 | 7,286,666 | 587,983 | 3,667,585 | 28,694,606 | 272 | 792 | 99 | 1,295 | 2,458 | 56.48 | 28.69 | 2.05 | 12.78 |
| 114.00 | 17,378,973 | 8,233,100 | 647,609 | 4,035,639 | 31,320,426 | 291 | 860 | 110 | 1,419 | 2,700 | 55.49 | 29.56 | 2.07 | 12.89 |
| 113.00 | 18,756,324 | 9,258,205 | 694,656 | 4,385,432 | 33,933,018 | 316 | 960 | 118 | 1,539 | 2,934 | 55.27 | 29.75 | 2.05 | 12.92 |
| 112.00 | 19,733,764 | 10,096,606 | 753,167 | 4,773,598 | 36,077,853 | 332 | 1,028 | 130 | 1,691 | 3,181 | 54.70 | 29.98 | 2.09 | 13.23 |
| 111.00 | 21,318,974 | 10,817,304 | 819,319 | 5,111,064 | 38,906,417 | 357 | 1,102 | 143 | 1,816 | 3,418 | 54.80 | 29.96 | 2.11 | 13.14 |
| 110.00 | 23,040,423 | 11,657,060 | 864,278 | 5,460,042 | 41,766,769 | 386 | 1,180 | 152 | 1,948 | 3,666 | 55.16 | 29.69 | 2.07 | 13.07 |
| 109.00 | 24,669,032 | 12,402,026 | 922,342 | 6,662,909 | 45,560,725 | 411 | 1,271 | 164 | 2,391 | 4,237 | 54.15 | 29.21 | 2.02 | 14.62 |
| 108.00 | 27,174,163 | 13,306,442 | 993,982 | 7,891,028 | 50,137,856 | 449 | 1,348 | 177 | 2,847 | 4,821 | 54.20 | 26.08 | 1.98 | 19.74 |
| 107.00 | 28,918,987 | 14,078,693 | 1,038,671 | 9,140,593 | 54,101,521 | 480 | 1,427 | 185 | 3,300 | 5,392 | 53.45 | 27.73 | 1.92 | 16.90 |
| 106.00 | 30,749,346 | 15,003,270 | 1,108,897 | 10,347,883 | 58,222,076 | 511 | 1,523 | 198 | 3,749 | 5,981 | 52.81 | 27.51 | 1.90 | 17.77 |
| 105.00 | 32,395,664 | 16,015,950 | 1,176,399 | 11,488,307 | 61,939,239 | 539 | 1,610 | 211 | 4,180 | 6,540 | 52.30 | 27.25 | 1.90 | 18.55 |
| 104.00 | 34,132,528 | 16,878,669 | 1,256,546 | 12,806,286 | 65,687,170 | 569 | 1,668 | 227 | 4,649 | 7,113 | 51.96 | 26.63 | 1.91 | 19.50 |
| 103.00 | 35,602,988 | 17,491,810 | 1,304,873 | 14,020,264 | 69,356,265 | 594 | 1,759 | 234 | 5,104 | 7,691 | 51.33 | 26.57 | 1.88 | 20.21 |
| 102.00 | 37,392,995 | 18,428,140 | 1,390,333 | 15,255,774 | 73,490,816 | 623 | 1,849 | 253 | 5,555 | 8,280 | 50.89 | 26.46 | 1.89 | 20.76 |
| 101.00 | 39,482,326 | 19,441,514 | 1,476,458 | 16,382,993 | 77,624,593 | 659 | 1,929 | 267 | 5,995 | 8,850 | 50.86 | 26.13 | 1.90 | 21.11 |
| 100.00 | 41,367,804 | 20,282,806 | 1,576,319 | 20,146,423 | 84,110,847 | 691 | 2,000 | 284 | 7,927 | 10,902 | 49.18 | 24.99 | 1.87 | 23.95 |
| 99.00 | 43,971,279 | 21,020,301 | 1,643,669 | 21,261,032 | 87,896,481 | 736 | 2,000 | 297 | 8,396 | 11,429 | 50.03 | 23.91 | 1.87 | 24.19 |
| 98.00 | 46,112,422 | 21,020,301 | 1,727,081 | 22,386,518 | 91,246,322 | 766 | 2,000 | 310 | 8,831 | 11,907 | 50.54 | 23.04 | 1.89 | 24.53 |
| 97.00 | 47,983,794 | 21,020,301 | 1,763,674 | 23,324,616 | 94,112,385 | 799 | 2,000 | 319 | 9,264 | 12,382 | 50.99 | 22.34 | 1.90 | 24.76 |
| 96.00 | 49,573,594 | 21,020,301 | 1,828,328 | 24,426,776 | 96,848,999 | 823 | 2,000 | 328 | 9,703 | 12,854 | 51.19 | 21.70 | 1.89 | 25.22 |
| 95.00 | 50,939,676 | 21,020,301 | 1,893,809 | 25,549,673 | 99,403,459 | 868 | 2,000 | 341 | 10,139 | 13,328 | 51.25 | 21.15 | 1.91 | 25.70 |

Fig. 16

Allocation Analysis — 610

| Price ($) | Total Share Demand | | | Pro Rata Ratio | Summary Allocation - Pro Rata | | | | | | | | | | | Total Shares Allocated |
|---|---|---|---|---|---|---|---|---|---|---|---|---|---|---|---|---|
| | Institutional | Retail | Total | | Institutional 1:1 | | Institutional Group | | Institutional DNP | | Institutional Total | | Retail | | | |
| | | | | | # Bidders | Share % | # Bidders | Share % | # Bidders | Share % | # Bidders | Share % | # Bidders | Share % | | |
| 85.00 | 83,200,131 | 33,319,020 | 116,519,151 | 0.0858228018 | 496 | 51.184 | 982 | 18.04 | 450 | 2.181 | 1,928 | 71.405 | 6,182 | 28.595 | | 10,000,000 |
| 84.50 | 83,233,828 | 33,530,979 | 116,764,807 | 0.0856422432 | 496 | 51.076 | 982 | 18.002 | 456 | 2.205 | 1,934 | 71.283 | 6,190 | 28.717 | | 10,000,000 |
| 84.00 | 83,244,869 | 33,764,332 | 117,009,201 | 0.0854633645 | 496 | 50.969 | 982 | 17.965 | 459 | 2.21 | 1,937 | 71.144 | 6,197 | 28.856 | | 10,000,000 |
| 83.50 | 83,274,800 | 33,942,415 | 117,217,215 | 0.0853117010 | 496 | 50.879 | 982 | 17.933 | 465 | 2.231 | 1,943 | 71.043 | 6,208 | 28.957 | | 10,000,000 |

Page # 1

*Fig. 17*

SYSTEMS AND METHODS FOR COMPILING AND ANALYZING BIDS IN AN AUCTION OF SECURITIES

BACKGROUND OF THE INVENTION

1. Field of the Invention

The present invention generally concerns systems and method for compiling and analyzing bids received from potential investors in an auction of securities.

2. Background

In an auction offering of financial securities (such as equity or debt securities), the entity handling the auction, typically the underwriter and/or the issuer, must compile and analyze the bids to determine the offering price and the allocations of the securities to the winning bidders. In well-publicized offerings, however, the bidding investors may collectively submit in excess of millions of bids. These bids must be compiled and analyzed in a timely and reliable manner. Accordingly, there exists a need for bid intake systems that can robustly and reliably compile and analyze bids received from the bidding investors.

SUMMARY

In one general aspect, the present invention is directed to an auction management system for compiling bids from bidders in an auction of securities. The securities to be auctioned may be equity securities or debt securities. Also, the auction offering may be, for example, an initial public offering, a secondary offering or a follow-on offering. The auction management system may also be used for a buyback in which the issuer offers to buy back shares of securities that it has previously issued. Also, according to various embodiments, especially for buybacks, the auction management system may be located at the issuer of the securities. According to various embodiments, the system includes a data striper and a bid aggregation system. The data striper is for striping bid data compiled from the bids of the potential investors into a plurality of stripes according to an algorithm such that all bids from a particular potential investor (i.e., bidder) are put into a common data stripe. The bid aggregation system is for aggregating the bid data in the stripes.

According to various implementations, the data striper may stripe the bid data according to an identifier for the bidders, such as the investor ID code for the bidders. The investor ID code may correspond to the tax identification number, the social security number, the passport number of the bidder, or a unique, pre-assigned identification code for a party.

The bid aggregation system may perform a first level aggregation on the bid data in the data stripes for combinations of a plurality of attributes related to the bid data. Also the bid aggregation system may perform a second level aggregation based on the first level aggregation. Further levels of integration may also be performed. Striping and aggregating the data in such a manner provides the capability to quickly and robustly analyze the potentially tremendous amount of bid data.

The auction management system may further comprise an analytics system for analyzing the aggregated bid data. The analytics system may receive user requests for analysis of the bid data, perform the analysis in real time based on the user inputs, and serve the results of the analysis to the user. The analysis may be, for example, a trial allocation to winning bidders based on a given supply of securities to be offered, an offering price for the securities, and a specified allocation scheme (e.g., pro rata, max share, etc.). The allocation determinations may be made on the investor level, or even down to the investor-account level. The analytics system may also detect potentially manipulative or disruptive bids from the bidders based on, for example, their bidding behavior. Also, the analytics system may permit analysis of the bidder demand for the auctioned securities.

The analytics system may provide real time analysis to multiple concurrent, asynchronous users. In order to do this, according to various embodiments, the system may poll the users to see if an analytical request has been made. If a request has been made, the system will read the user inputs and execute the requested analysis on the relevant bid data. In order to expedite the calculations so that users of the analytics system may obtain results in real time (i.e., within a small response time), the analytics system may employ an indexed memory structure. The indexed memory structure may include, for example, a hierarchically organized system of files containing the bid data for each bid price increment in the range of acceptable bid prices. That is, for example, a file may be created for each bid price increment in the range, and those files may contain the demand profile for the particular bid price by listing the number of bids received at each share lot size. In that way, when a user inputs a particular price (or price range) for trial allocation analysis, the analytics system can quickly retrieve the corresponding price file(s) and do real-time analysis. The results from the analysis may be stored in a database and served to the user via a host server. In other embodiments, the indexed memory structure may include an indexed database structure or memory cache structure.

These and other benefits of the invention will be apparent from the description to follow.

DESCRIPTION OF THE FIGURES

Various embodiments of the present invention are described herein by way of example in conjunction with the following figures, wherein:

FIGS. 9-17 depict user interfaces generated by the auction management system for analysis of the aggregated bid data according to various embodiments of the present invention.

DESCRIPTION OF THE INVENTION

Figure 1:
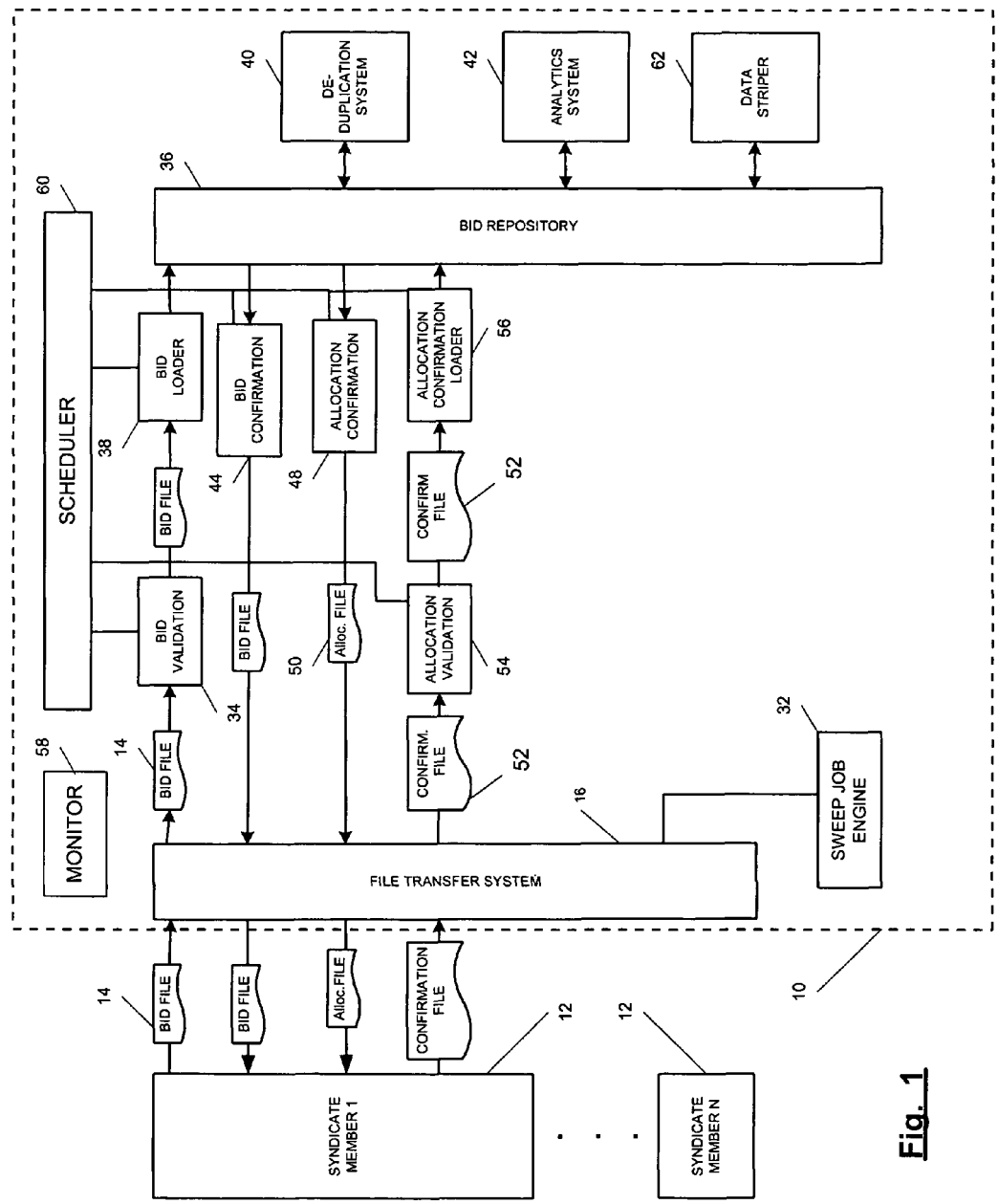
FIG. 1 is a diagram of an auction management system according to various embodiments of the present invention.

FIG. 1 is a diagram of an auction management system 10 according to various embodiments of the present invention.

The auction management system 10 may be used to manage an auction of securities issued by an issuing company (the "issuer"). The securities may be equity securities, such as common stock, debt securities, such as bonds or notes, or convertible instruments. For example, for an equities offering, the securities may be common stock issued by the issuer as part of an IPO, a secondary offering or a follow-on offering, and prospective bidders may input bids comprising a share price and a share quantity. For a debt offering, the bids may comprise a yield (e.g., an absolute rate, a spread above a benchmark rate of return, a coupon rate, etc.) and an indication of quantity (e.g., a dollar amount corresponding to a quantity of the debt securities to be purchased at par value). The description to follow assumes that the offered securities are equity securities, although it should be recognized that the description is applicable to debt security offerings. The offering may also be a buyback in which the issuer offers to buy back shares of securities that it has previously issued. In this case, the auction participants are holders of the issued securities, and the bids still include a price (or yield) and quantity.

In the auction management system 10 of FIG. 1, potential investors (not shown) may communicate bids to syndicate members 12 participating in the auction process. The syndicate members 12 may be, for example, broker/dealers. The syndicate may include one or more underwriters that assist the issuing company in the offering process. In various embodiments, investors may submit more than one bid, each such bid having a different combination of price and quantity. Also, bidding investors may submit bids to different syndicate members. As shown in FIG. 1, there may be N syndicate members.

When a syndicate member 12 is ready to submit bids received from bidding investors to the auction management system 10, the syndicate members 12 may prepare and submit a bid file 14 to a file transfer system 16 of the auction management system 10. The bid files 14 may conform to a predetermined file format and may include identifiers for the following information: an auction ID to identify the relevant auction, a code for the syndicate member, an investor ID, an account ID for the investor (e.g., an account number indicating the investor's account at the syndicate member), a country code for the investor, a code for the type of investor (e.g., individual or institutional), a code for the order type (e.g., institutional or retail order), a code for whether the bidding investor participated in the road show by the issuer, the bid amount (e.g., the quantity of securities requested), the bid price and a time stamp for the time the bid was received. The auction management system 10 may add data to various fields of the bid file 14 as the bids are validated or otherwise processed, as described in more detail below.

The investor ID may be, for example, the investor's tax identification number (TID), the investor's social security number, the investor's passport number, or a unique, pre-assigned alphanumeric identification code for the investor. The investor ID may also include the country-code of the issuing country (i.e., the country issuing the TID, social security number or passport number). As mentioned before, an investor may submit more than one bid. If an investor submits more than one bid with a single syndicate member 12, the bid file 14 may list each bid. If the investor submits different bids to different syndicate members, the bid files from the separate syndicate members may respectively list the separate bids from the investor.

Figure 2:
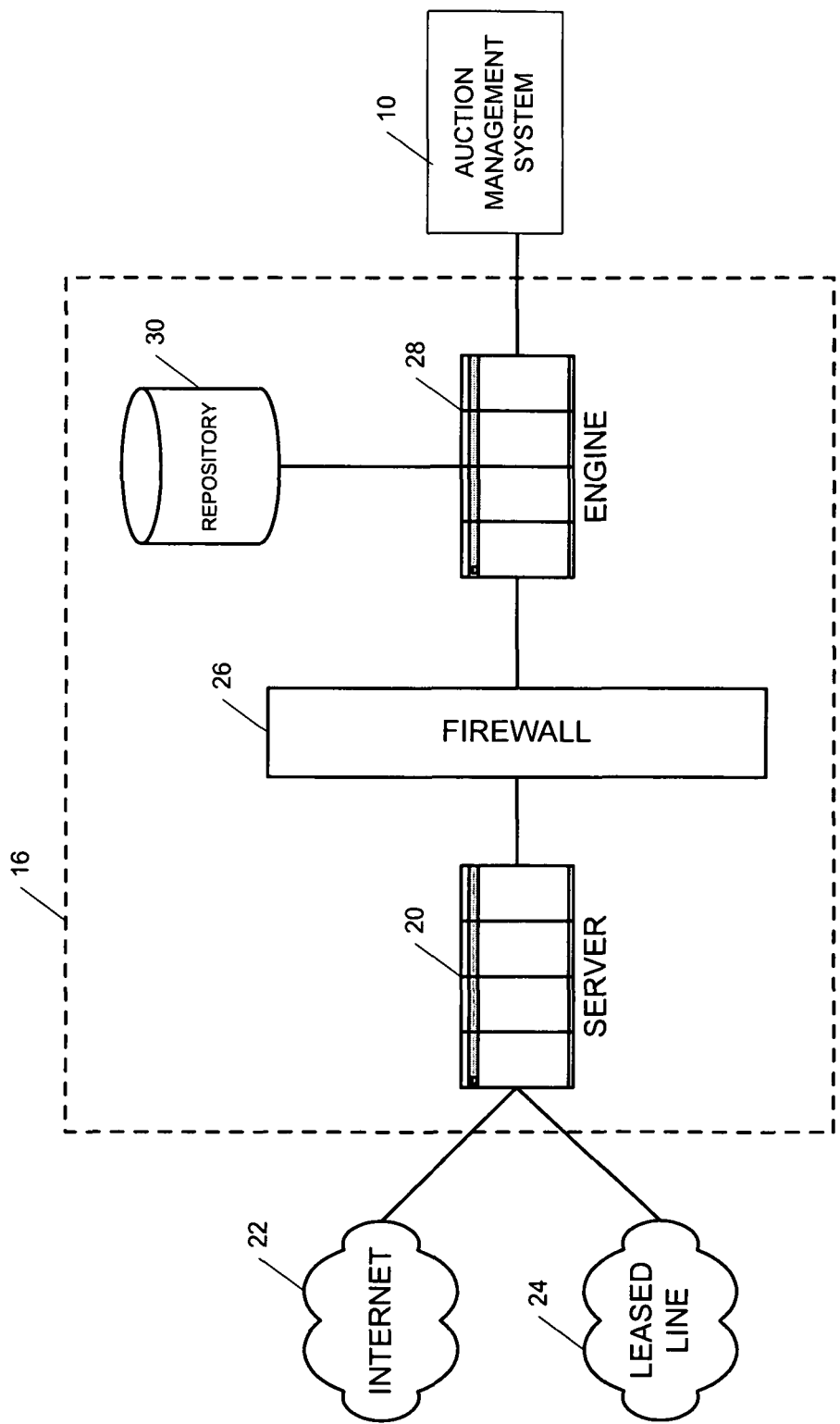
FIG. 2 is a diagram of a data transfer system according to various embodiments of the present invention.

The bid files 14 submitted to the auction management system 10 by the syndicate members 12 are preferably encrypted (such as with PGP or GPG encryption techniques) and compressed. The bid files 14 may be exchanged with the file transfer system 16 using, for example, the File Transfer Protocol (FTP). The file transfer system 16 preferably is a secure, automated file transfer system that allows the syndicate members 12 to easily exchange information with the auction management system 10. FIG. 2 is a diagram of the file transfer system 16 according to various embodiments of the present invention. A server 20 of the file transfer system 16 may receive the bid files from the syndicate members via data communication links, such as either the Internet 22 or a leased data communication line 24, for example. A firewall 26 may prevent unauthorized access to the auction management system 10. A file transfer engine 28 may store the uploaded files in a repository 30 and transmit the uploaded bid files from the repository 30 to the remainder of the auction management system 10 as needed. The engine 28 may also decrypt and uncompress incoming files, and encrypt and compress outgoing files.

When the bid files 14 have been successfully uploaded to the file transfer system 16, the file transfer system 16 may create a marker file (not shown) indicating completion of the file transfer. The marker file may be written to the repository 30. A sweep job engine 32 (see FIG. 1) may run through the file transfer system repositories 30 looking for the marker file. When found by the sweep job engine 32, the corresponding bid files 14 may be transmitted to a bid validation module 34. The bid validation module 34 may individually validate each bid file 14 submitted by the syndicate members 12. The bid validation module 34 may validate the bid files 14 by determining whether all of the data in the bid files are valid. For example, the bid validation module 34 may check to ensure that the bid price and/or quantity are not negative numbers, whether the auction and syndicate IDs are valid, whether the country code is valid, etc. If the bid is valid, the bid validation module 34 may update a bid status code of the bid file 14 to indicate that the bid is valid. The updated bid file 14 may then be uploaded into a bid repository 36 by a bid loader 38. The bid repository 36 may be, for example, a Sybase repository. In other embodiments, the bids from the investors may be submitted in real time.

As illustrated in FIG. 1, the auction management system 10 may also include a de-duplication system 40 and an analytics system 42. The de-duplication system 40 may determine whether an investor has submitted duplicative bids. If so, according to one embodiment, all or all but one of the duplicative bids may be determined to be invalid. According to other variations, all bids from the investor submitting duplicative bids (including non-duplicative bids) may be determined to be invalid. The analytics system 42 performs analysis on the bid data based on user requests. More details regarding the de-duplication system 40 and analytics system 42 are provided below.

A bid confirmation module 44 may update the bid file 14, such as by updating fields in the file to indicate that the bids are valid and/or confirmed. The updated bid file 14 may then be transmitted to the syndicate members 12 via the file transfer system 16. The sweeps by the sweep job engine 32 may be performed periodically. For example, for an auction lasting several days, the sweep job engine 32 may run daily, twice a day, or at some other interval. Updated bid data for analysis by the analytics system 42 is available following each sweep (or "sweep job").

Once the time period set for submitting bids has closed, shares of the issued securities can be allocated to the winning bidders. The clearing price for the auction may correspond to the lowest successful bid price. The offering price may correspond to the clearing price, or it may be different from the clearing price (for example, slightly less than the clearing price). All bidders submitting a bid price at or above the offering price may be allocated one or more shares. The shares may be allocated to the winners on, for example, a pro rata basis or on a "max share" basis. For pro rata allocations, a pro rata allocation percentage may be determined by dividing the total number of shares offered by the number of shares represented by valid successful bids. Each bidder who has a successful bid is allocated a number of shares approximately equal to the pro rata allocation percentage multiplied by the number of shares represented by the successful bid (subject to rounding of fractional shares).

In a max share allocation, all successful bidders who requested a number of shares equal to or in excess of the max share amount receive approximately the max share amount (subject to rounding of fractional shares), and successful bidders who requested less than the max share amount receive their requested amount.

Without rounding, the allocation process is likely to result in fractional shares being awarded to at least some investors. If all of the fractional shares are automatically rounded down, not all of the shares to be issued will be allocated. On the other hand, if all of the fractional shares are rounded up, the cumulative allocation to the investors will exceed the number of securities offered in the offering. To address this dilemma, a rounding algorithm may be used to ensure that each successful bidder is allocated an integral number of shares and that the total number of shares offered is allocated. Provided below is one way of solving this non-trivial problem.

Figure 2A:
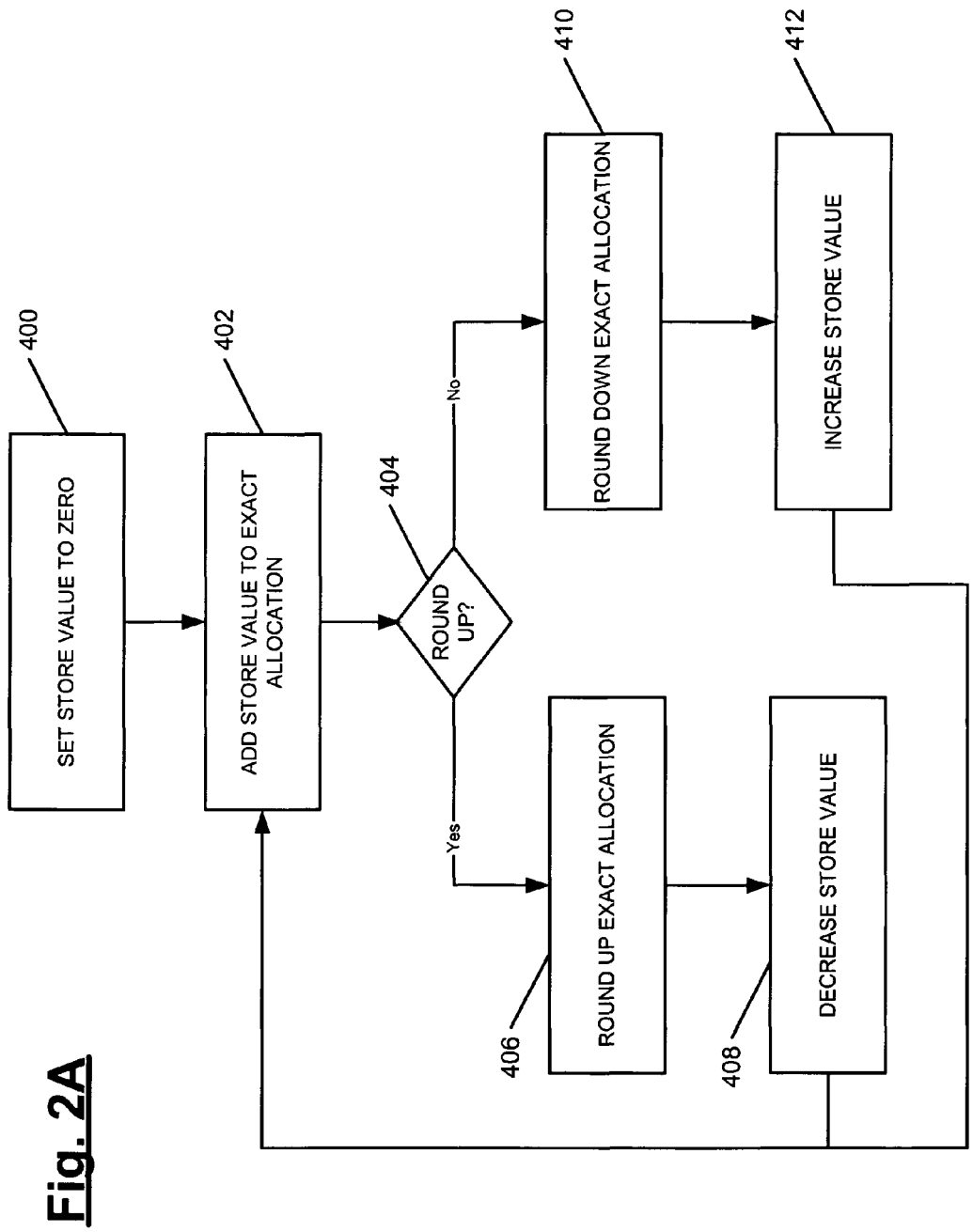
FIG. 2A is a diagram of a process for rounding off fractional share allocations according to various embodiments of the present invention.

FIG. 2A is a diagram of a rounding algorithm using a store approach that may be used according to various embodiments, and Table 1 below provides a simplified, hypothetical example of how the process may work using a pro rata allocation. In this example, 10,000 shares are offered, and the total number of shares demanded by the successful bids is 15,025. In that case, the pro rata allocation percentage is 66.5557404%. The allocation that the successful bidders would receive based on the pro rata allocation percentage, without rounding, is shown in column 3 of the table as the "Exact Allocation," computed by multiplying the pro rata allocation percentage by the number of shares demanded by the successful bidder (column 2).

TABLE 1

| Bidder | Shares Demanded | Exact Allocation | Store | Actual Allocation | Store After Allocation |
|---|---|---|---|---|---|
| A | 1,005 | 668.88519130 | 0 | 668 | 0.885191348 |
| B | 2,005 | 1,334.44259600 | 0.885191348 | 1,335 | 0.327787022 |
| C | 3,005 | 2,000.00000000 | 0.327787022 | 2,000 | 0.327787022 |
| D | 4,005 | 2,665.55740400 | 0.327787022 | 2,665 | 0.88519134 |
| E | 5,005 | 3,331.11480900 | 0.855191348 | 3,332 | 0 |
| Total | 15,025 | 10,000.00000000 | | 10,000 | |

Using the store approach, at step 400, the initial store value is set to zero. For the first successful bidder, at step 402, the store value is added to the "Exact Allocation" for the first bidder. Then, at step 404, whether the allocation to the first investor can be rounded up is determined based on the formula int|Store+Exact Allocation|≥int|Exact Allocation|+1. If this statement is true, then at step 406, the actual allocation to the investor is rounded up to the next integer (i.e., Actual Allocation=int|Exact Allocation|+1) and, at step 408, the store value is decreased by the appropriate amount (i.e., Store=Exact Allocation+Store−Actual Allocation). On the other hand, if at step 404 it is determined that the allocation to the investor should not be rounded up (i.e., int|Store+Exact Allocation|<int|Exact Allocaton|+1), then, at step 410, the allocation to the investor is rounded down (i.e., Actual Allocation=int|Exact Allocation|), and, at step 412, the store value is increased by the fractional portion of the exact allocation (i.e., Store=Store+Exact Allocation−int|Exact Allocation|). This process is repeated for each successful bidder, with the successful bidders being processed, for example, in a sorted order based on their investor ID number.

With reference to the example of Table 1, since the store value is zero for investor A, the actual allocation for investor A is rounded down to 668, and the store value is increased to the fractional value of the exact allocation to investor A, i.e., 0.88519348. The allocation to investor B is then rounded up to 1,335 because the sum of the revised store value (i.e., 0.88519348) and the exact allocation for investor B (i.e., 1,334.44259600) exceeds 1,335. In that case, the store value is revised down to 0.327787022. The process is repeated for each winning bidder.

With a max share allocation, successful bidders with bid sizes less than or equal to a maximum share amount receive share allocations for their entire bid amounts (subject to the rounding algorithm) and successful bidders with bid sizes greater than the maximum share amount receive the maximum share amount (subject to the rounding algorithm). That is, each successful bidder receives a share allocation approximately equal to the lesser of the number of shares represented by their successful bid and the maximum share amount. The maximum share amount is selected as the number of shares that result in the full allocation of the shares being offered. For example, assume 20,000 shares are offered, and the total number of shares subject to successful bids is 21,200. In this simplified, hypothetical example, as shown in Table 2, the maximum share allocation is 4,650 and the shares are allocated to the successful bidders as follows:

TABLE 2

| Successful Bidder | Shares Requested by Successful Bid | Share Allocation |
|---|---|---|
| A | 100 | 100 |

TABLE 2-continued

| Successful Bidder | Shares Requested by Successful Bid | Share Allocation |
|---|---|---|
| B | 2,100 | 2,100 |
| C | 4,000 | 4,000 |
| D | 4,500 | 4,500 |
| E | 5,000 | 4,650 |
| F | 5,500 | 4,650 |
| Total: | 21,200 | 20,000 |

In the example of Table 2, a rounding algorithm was not needed to ensure that all of the offered shares were allocated.

In practical applications of the max share allocation technique where the exact allocation to one or more successful investors includes fractional shares, a rounding algorithm such as the above-described store-approach rounding algorithm may be used.

Once the allocations are complete and finalized, using the pro rata, max share or any other allocation approach, an allocation confirmation module 48 may prepare an allocation file 50 for publication to the syndicate members 12 by the file transfer system 16. The syndicate members 12 may then confirm the allocations by submitting a confirmation file 52. The confirmation file 52 is validated by an allocation validation module 54 and loaded in the bid repository 36 by an allocation confirmation loader 56.

According to various embodiments, the process of validating bids, confirming bids, confirming allocation and validating allocations may be monitored by, for example, a web-based monitoring system 58. In addition, a scheduler 60 may schedule the process flow.

The bid validation module 34, the bid loader 38, the bid confirmation module 44, the allocation confirmation module 48, the allocation validation module 54 and the allocation loader 56 may be implemented as software code to be executed by processors (not shown) of the auction management system 10. The software code may use any suitable computer language, such as, for example, Java, C, C++, Sybase SQL, or Perl, etc., using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM.

Also, to increase system robustness, the auction management system 10 may utilize parallel processing techniques. For example, each syndicate member 14 may have an associated bid validation module 34, bid loader 38, bid confirmation module 44, allocation validation module 54 and allocation loader 56. That way, separate validation and confirmation systems can be dedicated to each syndicate member. Accordingly, the system 10 may include, for example, a validation system including a number of validation modules 34 operating in parallel to validate bid files 14 from the various syndicate members 12. For the sake of clarity, only the modules associated with one syndicate member are shown in FIG. 1, although it should be recognized that, according to various embodiments, there might be corresponding modules for each of the N syndicate members.

Figure 3:
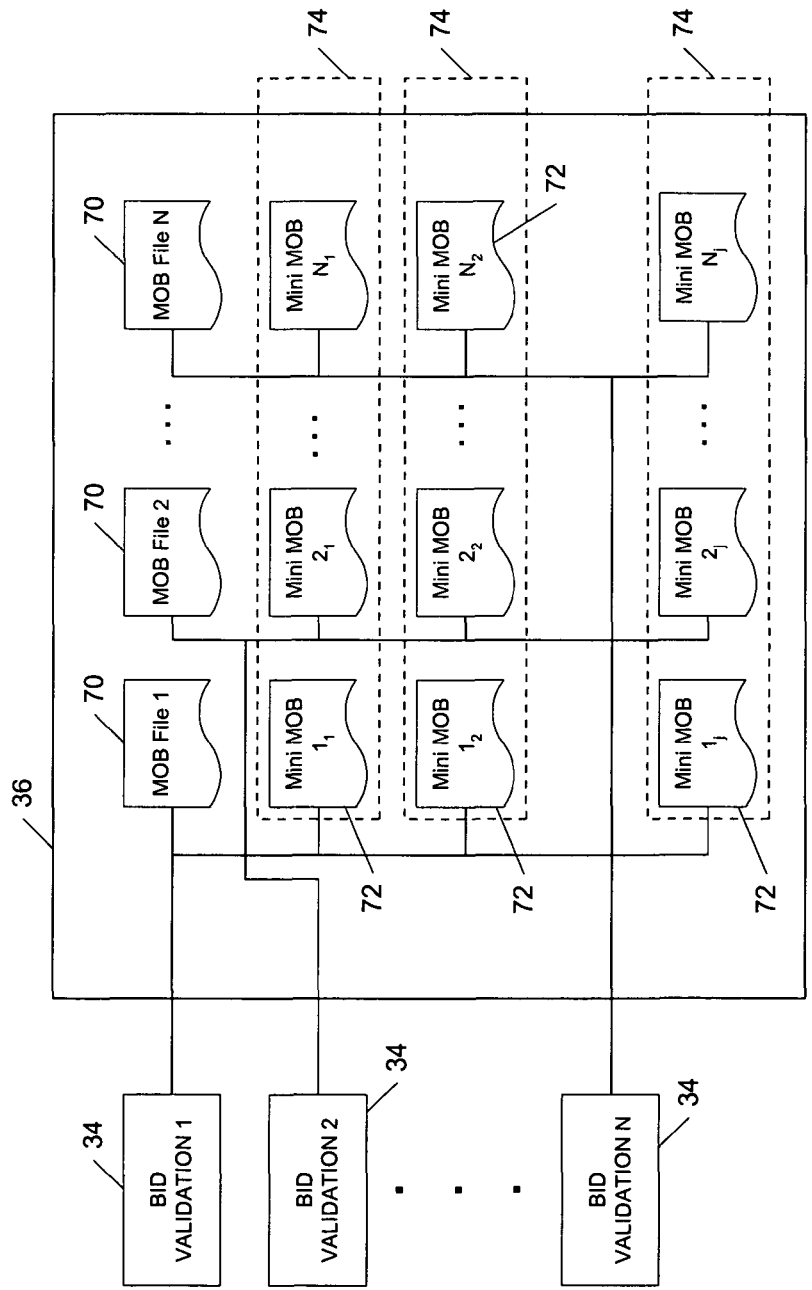
FIG. 3 is a diagram illustrating the data striping process performed by a data striper according to various embodiments of the present invention.

In order to more robustly analyze the bids, a data striper 62 may segment the data in the bid files 14 loaded into the bid repository 36 according to a data striping technique. Data striping involves the segmentation of logically sequential data into a number of segments or files. For example, according to various embodiments, as shown in FIG. 3, the bid repository 36 may include a master order book file (MOB) file 70 for each syndicate member 12. Thus, if there were N syndicate members, there would be N MOB files 70. In addition, the data striper 62 may segment the bid data for each syndicate member into a number of mini-MOB files 72. For example, the bid data for each syndicate member may be segmented into j mini-MOB files 72. In that case, there would be N×j such mini-MOB files 72. Flat files, databases or any other data storage and organization mechanism may be used for storage of the mini-MOB files.

The mini-MOB files 72 for each syndicate member may be segmented using an algorithm in a way that facilitates parallel aggregation of the data. Preferably, an algorithm that segments the bid data into more manageable pieces and that puts all bids from a particular bidder in the same data stripe is used. In that way, the number of unique bidders can be more easily and readily determined. According to one embodiment, for example, the algorithm may be based on the investor ID code. For example, the algorithm may segment the bid data based on a truncation the investor ID (e.g., the last one or more digits of the investor ID code). Recall that the investor ID code may correspond to the investor's TID, social security number, passport number, or a unique identification code. Thus, for such one embodiment, all bids from syndicate member 1 whose investor ID ends in 1 may be written to mini-MOB file $1_1$, all bids from syndicate member 1 whose investor ID ends in 2 may be written to mini-MOB file $1_2$, and so on. In addition, all bids from syndicate member 2 whose investor ID ends in 1 may be written to mini-MOB file $2_1$, all bids from syndicate member 1 whose investor ID ends in 2 may be written to mini-MOB file $2_2$, and so on. For such an embodiment, there would therefore be N×10 mini-MOB files.

Other algorithms may also be used to segment the mini-MOB files. For example, the digits in the Investor ID may be added up, and the digits of the resulting sum may be repeatedly added until there is just a single digit number. Another possible algorithm is to perform a modular operation on the binary number representing the Investor ID. Also, hash algorithms may be used to segment the data. Also, a look-up function may be used to segment the data. For example, bid data from bidders whose Investor ID starts with a particular digit or string of digits may be assigned to a specific data stripe.

In addition, all of the mini-MOB files 72 that are grouped together using the algorithm (for example, all of the mini-MOB files containing bid data from investors having the same last digit of their investor ID) may be grouped in a separate directory file (or stripe) 74. In that way, all of the bids with the same algorithm result (e.g., all bids with same range of investor IDs) may be stored in the same directory file 74 regardless of syndicate member. As such, parallel-processing techniques can be used to more robustly analyze the bid data. Individual processors or groups of processors may analyze the separate directory files 74.

For example, referring to FIG. 1, the de-duplication system 40 may comprise a number of processors. Each processor may analyze the bid data from a separate directory file 74 to look for duplicative bids, i.e., bids from the same investor that have the same combination of price and quantity. Because the bid data may be striped according to a truncation algorithm based on the investor ID (assuming, for example, that one investor never has more than one investor ID), all bids from a particular investor will be in the same stripe. That way, the de-duplication system 40 only needs to analyze one stripe to detect duplicative bids by an investor whose Investor ID algorithm result puts all of the investor's bids in one data stripe.

The data striper 62 may be implemented as one or a number of networked computing devices or processors that execute software code that manages the data striping process. The software code may use any type of suitable computer instruction type, such as, for example, Java, C, C++, Sybase, Visual Basic, etc., using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium such as a CD-ROM.

Figure 4:
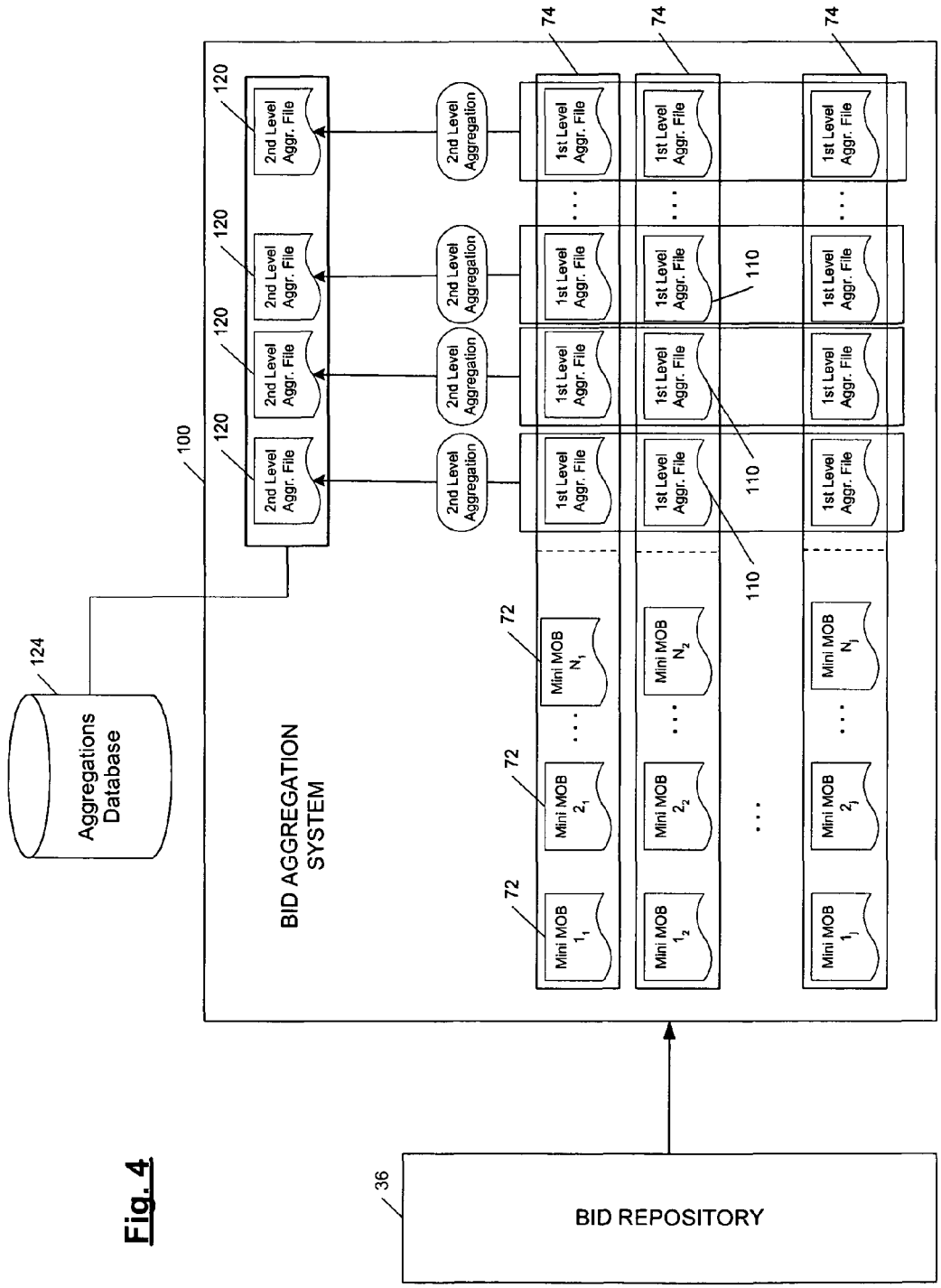
FIG. 4 is a diagram illustrating the aggregations performed by a bid aggregation system according to various embodiments of the present invention.

A bid aggregation system may aggregate the striped bid data in the bid repository 36. The bid aggregation system may perform multiple levels of aggregation and may be implemented as a number of computing or processing devices acting in parallel on the bid data to perform the aggregations. FIG. 4 illustrates how the bid aggregation system 100 may operate according to various embodiments of the present invention. The bid aggregation system 100 may first perform a level 1 aggregation on the mini-MOB files 72 in each directory file 74. The bid aggregation system 100 may perform the level 1 aggregation using different combinations of attributes of the bid data to thereby generate a number of first level aggregation files 110. The data for each attribute combination may be stored in a separate first level aggregation file 110. For example, if five attributes are used (e.g., attributes A, B, C, D, E), the bid aggregation system may perform an aggregation of the bid data for each combination of the five attributes (or $2^5=32$ combinations). The first file 110 may be an aggregation across attribute A, the second file 110 may be an aggregation across the combination of attributes A-B, the third file may be an aggregation across A-B-C, and so on. For performance reasons, the A-B aggregation may be built from the A-B-C aggregation, and the A aggregation may be built from the A-B aggregation, and so on. In order to more robustly aggregate the potentially voluminous bid data, a separate processor or group of processors of the bid aggregation system 100 may process each group (or directory file 74) of mini-MOB files 72. According to various embodiments, the bid aggregation system 110 may use hash tables or SQL to perform the first level aggregation.

The aggregation data in each first level aggregation file 110 may yield a demand curve for the particular attribute combination. For example, according to one variation, the attributes may be (1) syndicate member, (2) roadshow participation, (3) investor type (e.g., institutional or individual), (4) price range (e.g., a range such as $25 and higher), and (5) sweep job (e.g., last completed sweep job by the sweep engine 32). Thus, the first level aggregation file 110 may yield the demand curve from potential investors bidding through "syndicate member 1" for the first investor ID stripe (e.g., the mini-MOB files 72 of the first data stripe 74). The demand curve may show the number of shares bid for at particular prices. The aggregation data may also include the number of bidders, as well as the maximum bid and minimum bid. Table 3 below illustrates a simplified, theoretical example of a first level aggregation file 110 for an aggregation based on syndicate member and bid price level.

TABLE 3

| Syndicate Member | Price ($) | No. of Bidders | No. of Shares | Min. Bid | Max. Bid |
| --- | --- | --- | --- | --- | --- |
| Syndicate Member 1 | 25.00 | 110 | 4000 | 25.00 | 27.00 |
| Syndicate Member 1 | 26.00 | 100 | 3000 | 26.00 | 27.00 |
| Syndicate Member 1 | 27.00 | 90 | 2500 | 27.00 | 28.00 |
| Syndicate Member 2 | 25.00 | 224 | 40,450 | 25.00 | 28.00 |
| Syndicate Member 2 | 26.00 | 190 | 35,000 | 26.00 | 28.00 |
| Syndicate Member 2 | 27.00 | 150 | 25,000 | 27.00 | 31.00 |
| ... | | | | | |
| Syndicate Member N | 25.00 | 500 | 25,000 | 25.00 | 30.00 |
| Syndicate Member N | 26.00 | 400 | 20,000 | 26.00 | 30.00 |
| Syndicate Member N | 27.00 | 350 | 15,000 | 27.00 | 32.00 |

Similar demand curve data may be generated for each of the first level aggregation files. Because, in various embodiments, the mini-MOB files 72 are striped according to an algorithm based on an identifier for the bidder/investor, the first level aggregation files 110 may contain the aggregation for the particular attribute combination for the corresponding investor ID stripe. This enables the unique number of bidders to be correctly determined.

Next, as shown in FIG. 4, the bid aggregation system 100 may perform a second level aggregation of the first level aggregation files 110. That is, the bid aggregation system 100 may aggregate all the data from all of the first level aggregation files 110 for a particular attribute combination. As a result, according to various embodiments, the data from each of the investor ID range may be aggregated for each attribute combination. The aggregated data may be stored in corresponding second level aggregation files 120. Table 4 below is a simplified, theoretical example of a second level aggregation file 120 for an aggregation based on syndicate member and bid price level. The data is similar to the sample first level aggregation file of Table 3, except that the number of bidders and the number of shares bid are greater due to the fact that the second level aggregation covers all of the investor ID stripes, rather than just one investor ID stripe as in the first level aggregation files.

TABLE 4

| Syndicate Member | Price ($) | No. of Bidders | No. of Shares | Min. Bid | Max. Bid |
| --- | --- | --- | --- | --- | --- |
| Syndicate Member 1 | 25.00 | 1100 | 40,000 | 25.00 | 28.00 |
| Syndicate Member 1 | 26.00 | 1000 | 30,000 | 26.00 | 28.00 |
| Syndicate Member 1 | 27.00 | 900 | 25,000 | 27.00 | 28.00 |
| Syndicate Member 2 | 25.00 | 2240 | 404,500 | 25.00 | 31.00 |
| Syndicate Member 2 | 26.00 | 1900 | 350,000 | 26.00 | 31.00 |
| Syndicate Member 2 | 27.00 | 1500 | 250,000 | 27.00 | 31.00 |
| ... | | | | | |
| Syndicate Member N | 25.00 | 5000 | 250,000 | 25.00 | 32.00 |
| Syndicate Member N | 26.00 | 4000 | 200,000 | 26.00 | 32.00 |
| Syndicate Member N | 27.00 | 3500 | 150,000 | 27.00 | 32.00 |

In this way, the system can generate a demand curve at the syndicate member level and price level combination, as shown above, or another combination of attributes, or a single attribute. Again, in order to increase system robustness, a separate processor or group of processors of the bid aggregation system 100 may perform the second level aggregation for each separate attribute combination. Where, for example, five attributes are used in the first level aggregation, corresponding to thirty-two (32) first level aggregation files 110 for each stripe, there would correspondingly be thirty-two second level aggregation files 120. The second level aggregation files 120 may be bulk copied into an aggregations database 124. The aggregations database 124 may be part of the bid repository 36, or it could be its own database(s). Again, hash tables or SQL may be used for the second level aggregations.

In other embodiments, the data could be partitioned even further if appropriate by performing additional, higher levels of aggregation. Also, if that data is "lopsided", e.g., a relatively large number of bids are segmented into a relatively small number of stripes, then additional levels of aggregation may be used for the lopsided stripes. Grid computing solutions may be used for this process.

Figure 5:
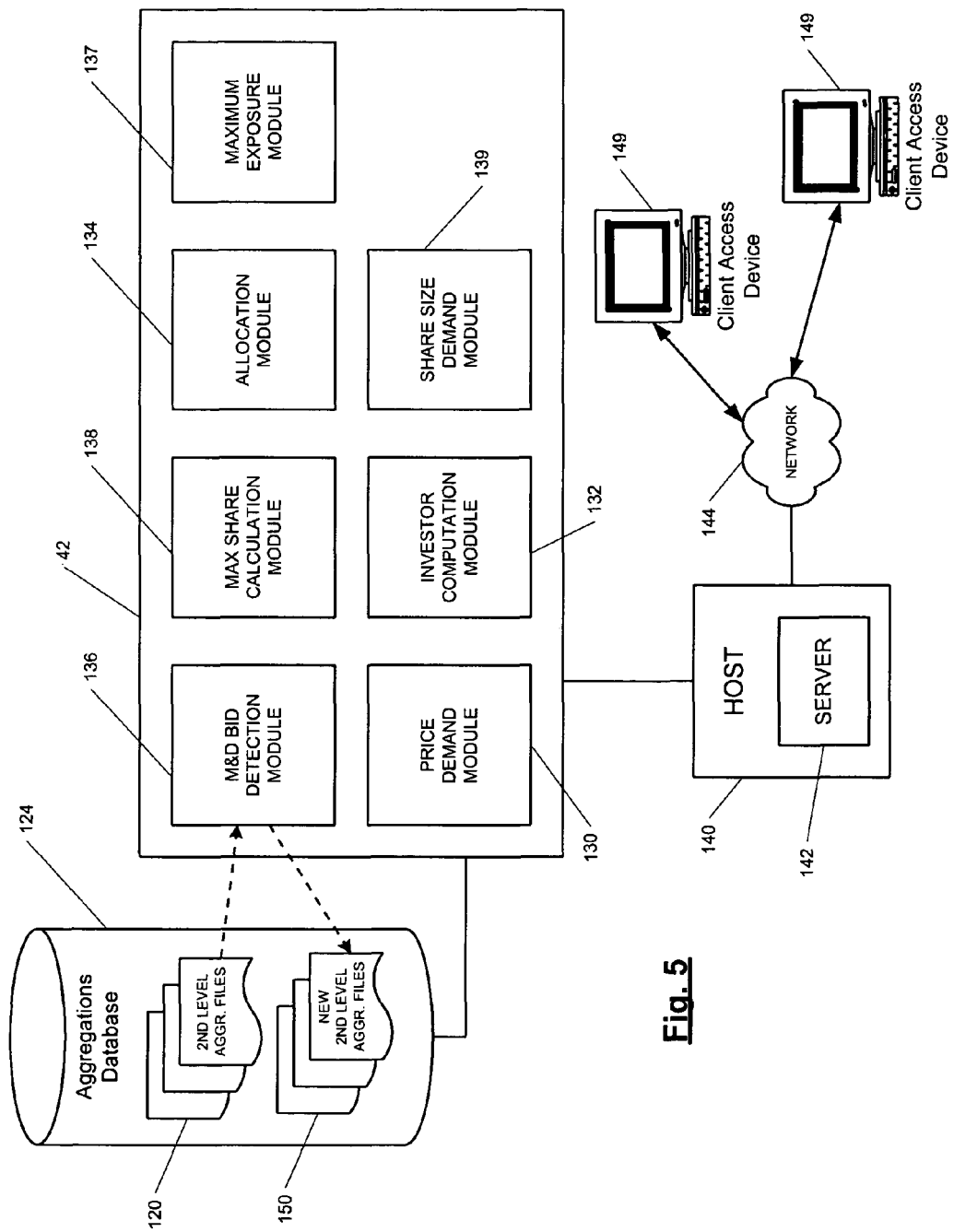
FIG. 5 is a diagram of an analytics system according to various embodiments of the present invention.

FIG. 5 is a block diagram of the analytics system 42 according to various embodiments. As illustrated in FIG. 5, the analytics system 42 may comprise a price demand module 130, an investor computation module 132, an allocation module 134, a manipulative and disruptive (M&D) bid detection module 136, a max share calculation module 138, a share size demand module 139, and a max exposure module 137. The modules may analyze the aggregate bid data, such as the bid data in the second level aggregation files 120 stored in the aggregations database 124, to provide analytics for users of the system 42 for trial allocations and other analysis of the offering, as described below.

Also as shown in FIG. 5, the auction management system 10 may include a host computing device 140 (referred to hereinafter as the "host"). The host 140, which is shown as a single device in FIG. 5 but which may be embodied as a series of networked computing devices, may include a server 142 for generating web pages based on the analytics generated by the analytics system 42. The server 142 may serve the generated web pages via a communications network 144, such as the Internet or an intranet, to registered users (such as the syndicate members and/or the issuing company) at client access devices 149 (such as personal computers, for example). In such a way, the users of the auction management system 10 may have, for example, web-enabled access to the analytics information generated by the analytics system 42. As described in more detail below, through a user interface provided by the host 140, users may input parameters to the analytics system 42 for trial allocations and/or investor computation analysis. The host 140 may receive the parameters and return output data computed by the analytics system 42 to the user via the network 144.

The analytics system 42 may be implemented as one or a number of networked computing devices, such as personal computers or servers. The modules 130-139 may be implemented as software code to be executed by a processor(s) (not shown) of the analytics system 42 using any type of computer instruction type suitable, such as, for example, Java, C, C++, Sybase, Visual Basic, etc., using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium such as a CD-ROM.

The M&D bid detection module 136 may generate a number of M&D bid files (e.g., 1, 2, 5, etc.) for each second level aggregation file 120. The M&D bid files may list potentially manipulative or disruptive bids based on criteria designed to detect such bids. There are a number of different criteria that may be used to detect manipulative or disruptive bids. For example, the M&D bid detection module 136 may analyze the dispersion in the aggregate bid data in (i) price, (ii) number of shares, (iii) number of bids, (iv) the maximum exposure (described further below), and/or (v) the distribution of bid prices from a bidder (e.g., every penny versus every dollar; low/high prices versus prices clustered in middle of price range, etc.) to detect outliers. The outliers may be considered to be manipulative and/or disruptive bids, and those bids may be listed in the M&D bid files. A number of such M&D bid files may be built for each second level aggregation file 120, each M&D bid file having, for example, different criteria for detecting manipulative/disruptive bids. For example, one M&D bid file may contain M&D identified bids based on the number of shares bid, and a second M&D bid file may contain M&D bids identified based on price, etc. The criteria may be input by a user or default criteria may be used.

In addition, the M&D bid detection module 136 may analyze a bidder's behavior over time to detect potentially manipulative or disruptive bids. For example, changes in the demand curve of a particular bidder over time may be indicative of a manipulative pattern. For example, if the shift in the bidder's demand is in accordance with the preponderance of the behavior by other like investors, or if the shift is expected, the bids may be deemed not to be manipulative or disruptive. On the other hand, other bidding patterns, such as very high price bids early in the bidding, followed by splitting demand between low and high prices later in the auction may be deemed to be a manipulative pattern. Other criteria may also be used to identify manipulative patterns. Also, similarity detection may be used across the bidding behavior of groups of bidders to detect potentially collusive bidding.

In various embodiments, M&D bid detection module 136 first compiles a list of bids identified as potentially manipulative/disruptive. Then, the syndicate members who submitted the manipulative/disruptive bids may be actively contacted to determine whether the bids are accurate or not. If the identified bids are determined to be accurate (e.g., no clerical input errors), the bids may be assumed to be manipulative/disruptive. In other embodiments, computer automation may be used to reject the bids identified as manipulative/disruptive.

The M&D bid detection module 136 may subtract the M&D bid files from their corresponding second level aggregation files 120 to generate a number of new second level aggregation files 150. The new second level aggregation files 150, therefore, would correspond to the prior second level aggregation files 120 but with the identified manipulative/disruptive bids removed. For each original second level aggregation file 120, there would be a corresponding number of new second level aggregation files 150 depending on the number of M&D bid files generated for each original second level aggregation file 120. For example, if two M&D bid files were built for each original second level aggregation file 120 (corresponding to different criteria for identifying M&D bids), there would be two new second level aggregation files 150 for each original second level aggregation file 120, and so on. Thus, for example, if there were thirty-two original second level aggregation files 120 and two M&D bid files were generated for each original second level aggregation file, there would be sixty-four new second level aggregation files 150.

The price demand module 130 may interpolate the bid data (such as from the new second level aggregation files 150) to generate an aggregate price demand curve. The price demand curve data may be generated by determining the number of shares requested at each price in the range of possible bid prices. To generate the number of shares bid at each price, a cumulative approach may be used. That is, for example, the aggregate demand at any particular price point may be assumed to be the sum of the demand at the particular price point plus the demand at each greater price point. For example, assume the aggregate bid data shown in Table 5.

TABLE 5

| Price ($) | Number of Shares Bid |
|---|---|
| 10.00 | 2000 |
| 11.00 | 1250 |
| 12.00 | 900 |
| 13.00 | 850 |
| 14.00 | 800 |
| 15.00 | 1500 |
| 16.00 | 1200 |
| 17.00 | 1100 |
| 18.00 | 900 |
| 19.00 | 800 |
| 20.00 | 1250 |

Figure 6:
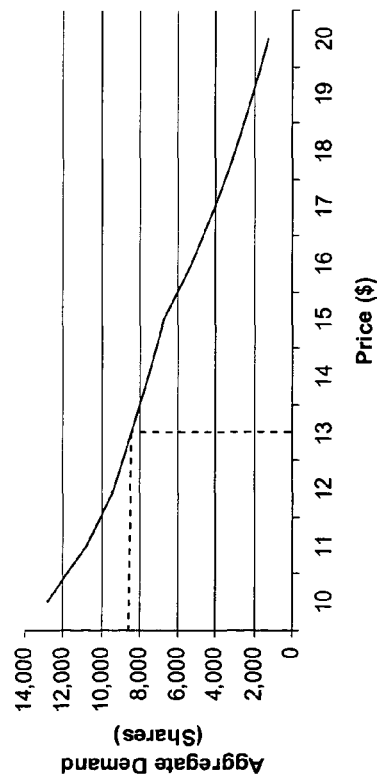
FIGS. 6 and 7 are exemplary charts generated by the analytics system according to various embodiments of the present invention.

In this example, the aggregate demand data would be that shown in Table 6 and graphically represented in FIG. 6.

TABLE 6

| Price ($) | Number of Shares | Aggregate Demand |
|---|---|---|
| 10.00 | 2000 | 12,550 |
| 11.00 | 1250 | 10,550 |
| 12.00 | 900 | 9300 |
| 13.00 | 850 | 8400 |
| 14.00 | 800 | 7550 |
| 15.00 | 1500 | 6750 |
| 16.00 | 1200 | 5250 |
| 17.00 | 1100 | 4050 |
| 18.00 | 900 | 2950 |
| 19.00 | 800 | 2050 |
| 20.00 | 1250 | 1250 |

As can be seen, the aggregate demand at $19.00 corresponds to the number of shares bid at $19 plus the number of shares bid at $20; the aggregate demand at $18.00 corresponds to the number of shares bid at $18, in addition to the number of shares bid at $19 and $20, and so on.

In the illustrated example, the price points are whole dollar amounts. Of course, in a practical implementation, bids may be placed on the cent level or some other increment (5 cents, 10 cents, etc.). Also, the numeric range of the bids may be different than $10 to $20. From the demand curve of FIG. 6, it can be seen that if the issuing company wishes to issue 8,400 shares, the clearing price would be $13.00 for this example. The price demand module 130 may generate such a price demand curve for each of the second level aggregation files, or a subset of the files, for example.

The investor computation module 132 may determine the number of investors/bidders at each price point (i.e., the aggregate number of investors for each price point). Recall that in certain auctions, an investor may be able to submit multiple bids, each having a different combination of price and quantity. According to one embodiment, the ability of investors to submit multiple bids may be treated in the determination of the number of investors per price bid by counting a bidder once at every price point up to the highest bid by the investor. For example, assume bidders A through E placed bids as shown in the example of Table 7 below. That is, investor A submitted bids at $14, $17 and $20, investor B submitted bids at $15 and $19, and so on.

TABLE 7

| Investor/Price | $10 | $11 | $12 | $13 | $14 | $15 | $16 | $17 | $18 | $19 | $20 |
|---|---|---|---|---|---|---|---|---|---|---|---|
| A | 0 | 0 | 0 | 0 | 1 | 0 | 0 | 1 | 0 | 0 | 1 |
| B | 0 | 0 | 0 | 0 | 0 | 1 | 0 | 0 | 0 | 1 | 0 |
| C | 1 | 0 | 0 | 0 | 0 | 0 | 0 | 0 | 0 | 0 | 0 |
| D | 0 | 0 | 0 | 0 | 0 | 1 | 0 | 0 | 0 | 0 | 1 |
| E | 0 | 0 | 0 | 1 | 0 | 1 | 0 | 1 | 0 | 0 | 0 |

In that case, the investor computation module 132 may count the bids of the various bidders once at each price point up to the highest bid for the respective bidder, so that the corresponding demand table for this example would be as shown in Table 8.

TABLE 8

| Investor/Price | $10 | $11 | $12 | $13 | $14 | $15 | $16 | $17 | $18 | $19 | $20 |
|---|---|---|---|---|---|---|---|---|---|---|---|
| A | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 0 |
| C | 1 | 0 | 0 | 0 | 0 | 0 | 0 | 0 | 0 | 0 | 0 |
| D | 1 | 1 | 1 | 1 | 1 | 1 | 1 | 1 | 1 | 1 | 1 |
| E | 1 | 1 | 1 | 1 | 1 | 1 | 1 | 1 | 0 | 0 | 0 |
| Total Number of Unique Bidders | 5 | 4 | 4 | 4 | 4 | 4 | 4 | 4 | 3 | 3 | 2 |

Figure 7:
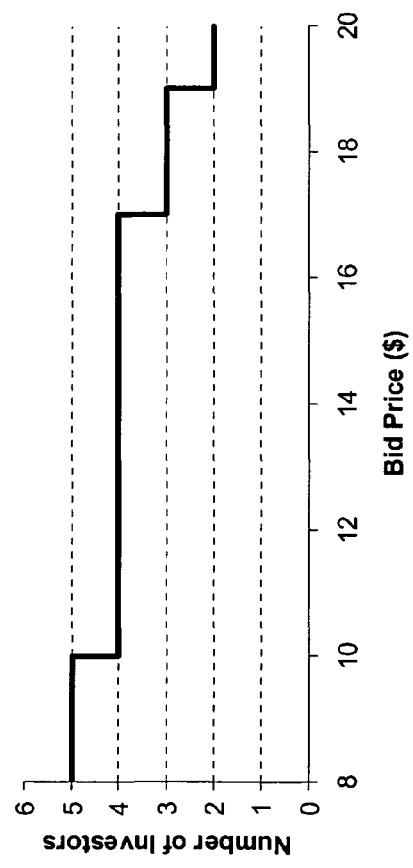

FIG. 7 shows the corresponding curve for the number of investors at each price point. Each investor is counted at every bid price increment up to the highest bid price for the investor (so-called "back-filling"). Therefore, the number of investors at $20 is two in this example (investors A and D). The demand at $19 is three (investors A, B and D), and the demand at $17 is four (investors A, B, D and E). Notice that investor A is not recounted at $17 because investor A is counted only once at each bid increment up to investor A's highest bid, which is $20 in this example for investor A. In this manner, the investor computation module 132 may generate the curve showing the number of investors at each price point. The investor computation module 132 may generate such a curve for each of the second level aggregation files, or a subset of the files.

The share size demand module 139 may compute the number of bidders versus the share lots for the bids at particular price points. That is, for a particular bid price ($x), the share size demand module 139 may determine the number of bidders who requested each possible share size lot. The prices at which the share size demand module 139 may do this computation may span the entire range of bid prices, or a subset of the bid price range. In that way, the share size demand module 139 may determine the number of bidders who bid $x at each permissible share lot size in the auction over the range of permissible share lot sizes (e.g., 1 share to 10 million shares). In other words, the share size demand module 139 may generate a histogram to show the number of bidders for each share lot size at a particular price point. The share size demand module 139 may generate a number of such histograms, covering a range of bid prices. The histogram data for each bid price increment may be stored in a separate file so that it may be quickly accessed when requested by a user.

For bid aggregation purposes, to increase the computation speed associated with the system, the quantity bids may be bucketized into various bid size buckets (which may not necessarily match the allowable bid size increments in the auction). For example, the buckets for bid sizes between 1 and 999 shares may be 1; for bids sizes between 1000 and 10000 shares the buckets may be in steps of 100 shares (e.g., buckets of 1000, 1100, 1200, and so on); for bids sizes between 10,000 and 100,000 shares, the buckets may be in steps of 1000 shares; for bid sizes between 100,000 and 1,000,000, the buckets may be in steps of 10,000 shares; and for bid sizes between 1,000,000 and 10,000,000, the buckets may be in steps of 100,000 shares. In various embodiments, no bids over 10,000,000 shares may be permitted in the auction. Such a bucket format limits the number of allowed share lots (or buckets) for bid aggregation purposes. Limiting the number of share lots (or buckets) may correspondingly decrease the computation time by the share size demand module 139 (and the other modules) in analyzing the bid data. The share size demand module 139 may compute the number of bidders versus the share lots for each of the second level aggregation files, or a subset of the files. It should be noted that the buckets used for bid aggregation purposes need not be used nor correspond to the permissible bid sizes in the auction for allocation purposes; the allocation module 134 may compute the allocation in share sizes that correspond to share sizes that are permissible in the auction.

The max share calculation module 138 may calculate the maximum share allocation for a particular supply (S) of securities to be offered at a particular offering price (P). In a maximum share allocation approach, winning bidders who have bid for a number of shares less than or equal to the maximum share allocation get the amount they bid, and winning bidders who bid for a greater number of shares get the maximum share allocation, subject to the rounding algorithm described above. A user of the auction management system 10 may set the supply S and the offering price P for trial allocations via the user-interface provided by the host 140.

The max share calculation module 138 may calculate the max share amount for offerings where only certain share size buckets are possible as quantity bids (see above description) or it may calculate the max share amount on a per-share level where a bidder may submit a quantity bid of any share size (or any share size between the minimum and maximum allowed amounts). To speed up the calculation of the max share amount, a separate file may be used to store the bid data for each bid price increment (e.g., $15 to $25 by increments of 10, 100, etc.). Within each such file, the max share calculation module 138 may sort the bids according to size (i.e., number of shares requested). The max share calculation module 138 may then compute the max share amount for each file for a given supply. In that way, when a user inputs a price and supply for a trial allocation, the max share calculation module 138 only needs to retrieve the relevant price file in order compute the max share amount, thereby potentially reducing computation time.

Figure 8:
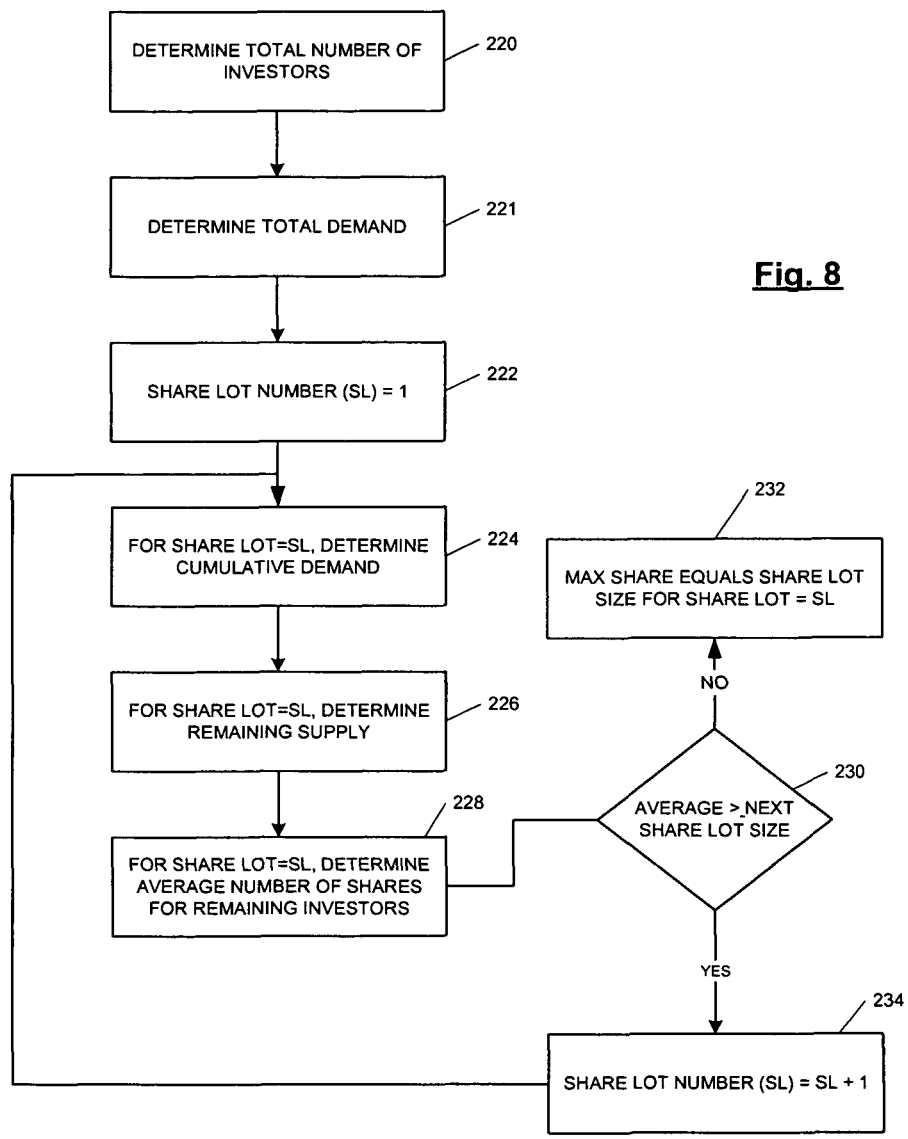
FIG. 8 is a diagram of the process flow through a max share calculation module according to various embodiments of the present invention.

FIG. 8 is a diagram of the process flow through the max share calculation module 138 according to various embodiments of the present invention for calculating the max share amount for a given supply (S) at a particular price (P). At step 220, the total number of investors (i.e., winning bidders) at the share price may be determined. Every investor who bid at or above the selected offering price P is considered a winning bidder (with the exception that bidders who made manipulative/disruptive bids may be excluded).

Next, at step 221, the demand or number of shares bid for by each winning bidder is determined. For bidders who made only one bid at or above the offering price, the number of shares for those investors corresponds to the number requested in that one bid. For bidders who submitted multiple bids at or above the selected offering price, a number of different approaches may be used to determine the number of shares bid for by such winning bidders. According to one approach, the bidder is assumed to have requested the number of shares for the winning bid price that is closest (and necessarily equal to or greater than) the offering price. For example, assume Bidder A makes three bids as shown below:

300 shares at $20
100 shares at $25
200 shares at $30

If the selected offering price is $22, then Bidder A may be assumed to have requested 100 shares in this approach because $25 is the closest winning bid by Bidder A to the selected offering price and Bidder A requested 100 shares at $25.

According to a second, "cumulative" approach, winning bidders are assumed to have requested the sum of all shares requested for all winning bids by the bidder. Thus, in the above example, Bidder A would be assumed to have requested 300 shares at an offering price of $22, calculated as 100 shares for the winning bid of $25 and 200 shares for the winning bid of $30. Either approach, or potentially other approaches, may be used at step 221 to determine the number of shares requested by the winning bidders.

Next, at step 222, the share lot number (SL), i.e., the ordinal number or counter for the share lots (not necessarily the number of shares in the share lot size), is set equal to one, corresponding to the first share lot.

Next, at step 224, the cumulative demand for the $SL^{th}$ share lot (e.g., the first share lot when SL=1) is determined. The cumulative demand corresponds to the demand for the $SL^{th}$ share lot (which equals the number of investors who requested a number of shares equal to the size of the share lot times the size of the share lot) plus the demand for each smaller share lot. That is, the cumulative demand for the $i^{th}$ share lot corresponds to $$\sum_{i=1}^{SL} D_i,$$

where $D_i$ is the demand for each respective share lot (see FIG. 7 and Table 8). At step 226, the remaining supply is determined. The remaining supply corresponds to the supply (which may be entered by the user via the user interface) minus the cumulative demand $$\left(\text{i.e., } S - \sum_{i=1}^{SL} D_i\right).$$

Next, at step 228, the average number of shares for the remaining investors is determined. This average (A) corresponds to the ratio of the remaining supply to the remaining number of investors. The remaining number of investors corresponds to the total number of winning investors minus the number of investors for each share lot up to and including the $SL^{th}$ share lot. Thus, if, for example, there were 1000 winning bidders and the number of winning bidders accounted for in a share lot up to and including the $SL^{th}$ share lot is 650, then there are 350 remaining investors in this example. Next, at step 230, a determination is made of whether the average number of shares for the remaining investors for the $SL+1^{th}$ share lot ($A_{SL+1}$) is greater than the share lot size for the next ($SL+1^{th}$) share lot. If so, the process advances to step 234, where the counter SL is incremented by one and the process returns to step 224, where the process is repeated for the next ($SL+1^{th}$) share lot. On the other hand, if the average number of shares for the remaining investors is not greater than the share lot size for the next share lot size, the process advances to step 232 where the maximum share allocation is determined to correspond to the size of the $SL^{th}$ share lot.

The following is a simplified, numerical example of how the max share calculation may operate. Suppose the supply of shares (S) is thirty shares and the bid data at the requested offering price P is as shown in Table 9 below.

TABLE 9

| Share Lot No. (SL) | Size of Share Lot (# of Shares) | No. of Investors | Cum. Demand | Remaining Supply | Average for Remaining Investors |
|---|---|---|---|---|---|
| 1 | 1 | 2 | 2 | 28 | 2.54 |
| 2 | 2 | 3 | 8 | 22 | 2.75 |
| 3 | 3 | 3 | 17 | 13 | |
| 4 | 4 | 4 | 33 | −3 | |
| 5 | 5 | 1 | 38 | −8 | |

In this example, at step 220, the total number of investors is determined to be thirteen (13) (calculated by summing the entries of col. 3). At step 224, for the first share lot, the cumulative demand is calculated, which corresponds to two (2) in this example, calculated by multiplying two investors by 1 share each. Next, at step 226, the remaining supply is computed, which is 30−2=28, and at step 228 the average number of shares for the remaining investors is determined to be 28/(13−2)=2.54. Thus, because the average (2.54) is greater than the size of the next share lot size (the share lot size for the second share lot is two (2) shares), the process is repeated for the second share lot.

In repeating the process for the second share lot size, the cumulative demand is determined at step 224 to be 8, calculated as 6 for the second share lot plus 2 for the first share lot. The remaining supply is 22 and, therefore, the average for the remaining investors is 22/(13−5)=2.75. Because the average (2.75) is less than the size of the next share lot size (the share lot size for the third share lot is three (3) shares), the maximum share allocation in this example is two shares. Thus, the investors in the first share lot get one share, and the investors in each of the subsequent share lots get two shares (subject to rounding of fractional shares).

The allocation module 134 may determine the allocation to successful bidders given a specified price, supply and allocation scheme. That is, as described in more detail below, a user of the analytics system may input a price, a supply and an allocation scheme (e.g., pro rata, max share, a hybrid of the two, etc.) and the allocation module 134 may compute the allocation to the winning bidders. In this way, a user could evaluate the allocations for different trials of price, supply and allocation scheme. The allocation module 134 may use a rounding algorithm, such as the store-based rounding approach described above, for the chosen allocation scheme.

In addition, the allocation module 139 may compute the allocation for each successful bidder on a bidder-account level. That is, in some instances, the same investor may participate in the auction through multiple accounts. The initial allocation, such as according to either the max share or pro rata approach, of the offered shares may be on the investor level (e.g., Investor A is allocated 10,000 shares). In order to allocate down to the account level, according to various embodiments, the number of shares allocated to the investor may be spread pro rata across the various accounts of the investor used to submit bids in the auction. That is, for example, if Investor A submitted bids for three different accounts, the allocation module 139 may spread Investor A's allocation of 10,000 shares across the three accounts. According to one embodiment, the allocation down to the investor-account level may use a pro rata approach; that is, the investor's allocation is spread pro rata across the investor's accounts. Such pro ration may lead to fractional shares. One mechanism to deal with the fractional shares is to sum all of the fractional parts in advance. This total remainder R will be by definition less than the number of accounts. An additional share may be assigned to R of the investor's accounts.

The max exposure module 137 may compute the maximum ("max") exposure for a bidder. To calculate a bidder's max exposure, the max exposure module 137 computes the bidder's exposure at each bid price by multiplying the bid price times the number of shares demanded at the bid price (recalling that the shares demanded at bid prices greater than the subject bid price may be included in the demand for the subject bid price). The bidder's max exposure is the maximum of the exposures for the various bid prices. For example, suppose a bidder submits a series of bids as shown in Table 10 below.

TABLE 10

| Bid No. | No. of Shares | Bid Price | Max Exposure |
|---|---|---|---|
| 1 | 1000 | $50 | $50,000 |
| 2 | 100 | $40 | $44,000 |
| 3 | 500 | $35 | $56,000 |
| 4 | 1000 | $30 | $78,000 |

In this example, the bidder's exposure at $50 is $50,000, computed as 1000 shares demanded times $50 per share. The bidder's exposure at $40 is $4400, computed as 1100 shares demanded (i.e., counting the 100 shares bid at $40 and the 1000 shares bid at $50) times $40, and so on. In this example, the bidder's maximum exposure is $78,000.

Output of the analytics system 42 may be served to users via the network 144, such as by serving web pages to the user access devices 149 over a secure TCP/IP network. The users may be, for example, persons or representatives associated with the issuing company and/or the underwriters. Access to the web pages is preferably limited to users who are not eligible to participate in the auction.

The analytics system 42 may provide real time analysis to multiple concurrent, asynchronous users. In order to do this, according to various embodiments, the system 42 may poll the users to see if an analytical request has been made. If a request has been made, the system 42 will read the user inputs (e.g., price, supply, allocation, M&D criteria, etc.) and execute the requested analysis on the relevant bid data. In order to expedite the analytical calculations so that users of the analytics system 42 may obtain results in real time (i.e., within a small response time), the analytics system 42 may employ an indexed memory structure. According to various embodiments, the indexed memory structure may include a hierarchically organized system of files containing the bid data for each bid price increment in the range of acceptable bid prices. That is, for example, a file may be created for each bid price increment in the range, and those files may contain the demand profile for the particular bid price by listing the number of bids received at each share lot size. For example, the file for price P might show 3 bids of 100 shares, 5 bids of 120 shares, 8 bids of 150 shares, etc. The files may be organized in a hierarchical manner, such as, for example, based on the digits in the price, with the most significant digit being at the top of the hierarchy and the least significant digit at the bottom. In that way, when a user inputs a particular price (or price range) for trial allocation analysis, the modules of the analytics system 42 can quickly retrieve the corresponding price file(s) and do real-time analysis.

According to other embodiments, the indexed memory structure may include an indexed database structure or indexed memory cache structure that facilitates rapid retrieval of the bid data for the price increments used in the analysis.

The results from the analysis may be stored in a database and served to the user via the host 140. When a user's request has been completed, the system 42 may set the status flag for the request to "Done" and commence the next request job.

An interactive web page interface served to a user, such as shown in FIG. 9, may allow the user to specify the type of analysis that the user wishes to perform, such as run trial allocations or to analyze the demand of the auctioned securities among groups of bidders. Based on the user's request, the host 140 may serve other web pages that show the outcome of the analysis based on the user's inputs. For example, as shown in FIG. 9, the interface may include a display area 500 including an analytics menu. The analytics menu 500 may, for example, contain links to various analytical tools or links that allow the user to specify parameters for trial offerings. For example, the link 502 may provide a hyperlink to the Master Order Book (MOB), as shown in section 504 of the interface of FIG. 9. The menu 500 may also include demand analysis links and allocation analysis links, described further below. The demand analysis links also allow the user to analyze the auction demand in various ways. The allocation analysis links may allow the user to test a variety of allocation scenarios (sometimes referred to herein as "trial allocations").

The MOB overview, as shown in FIG. 9, may allow the user to input choices for various attributes of the bidders for the offering. In response to the inputs, the analytics system 42 may compute the corresponding bid data analytics for bidders meeting the attribute settings and the results may be served to the user. For example, in field 506, the user may select, via, for example, a drop-down window or other known selection techniques, a particular syndicate member or group of syndicate members. The analytics system 42 would then run the analytics on the bids submitted with the selected syndicate member or members. For example, as shown in FIG. 9, the user may select "All" for all of the syndicate members. In field 508, the user may select, via, for example, a drop-down window, the investor type (e.g., retail, institutional, all). The analytics system 42 would then run the analytics on the bidders who satisfy the investor type setting as well. In field 510, the user may select, via, for example, a drop-down window, a roadshow participation setting. The roadshow participation setting may be "All," as shown in FIG. 9 (meaning all the bid data from all investors are analyzed regardless of whether the investor attended a roadshow event or not), or the roadshow setting may indicate, for example, a one-to-one meeting with the management of the issuer, or a group meeting with the management and other potential investors.

The analytics system 42 may compile/analyze the bid data for bidders who satisfy the selected attribute parameters and the results may be served to the user in the chart display 504, as shown in FIG. 9. For each bidder that satisfies the attribute parameters, as shown in FIG. 9, the chart may identify attributes of the bidder, such as ID, name (a code name may be used), investor type (e.g., institutional, retail, etc.), whether and what type of roadshow the investor participated in, the number of syndicate members used, etc. The chart may also list, as shown in FIG. 9, the total number of bids submitted by the bidder, the maximum exposure of the bidder (as determined by the max exposure module 137), as well as the specifics (e.g., price and size) of the bidder's maximum and minimum price bids. In addition, the chart may list the number of successful bids of the investor at the selected offering price for the analysis (in this example, $86.01 per share), the number of shares requested by the bidder in those winning bids, the allocation to the various bidders (as determined by the allocation module 134), and the total value of the bidders' allocation (allocation times share price). In this example, a max share allocation approach was used where the max share amount was 107,514 shares. All of the listed bidders in this example received the max share amount. Other bidders, not listed in the figure, may receive less than the max share amount.

As can be seen in FIG. 9, the "Investor Name" for the respective bidders may contain a hyperlink to details about the respective bidders' bids. For example, as shown in FIG. 10, by clicking on the hyperlink for the investor name associated with a bidder, the details of each bid by the selected bidder, including the times the various bids by the bidder were placed, the syndicate member with whom the bids where placed, and the price and share amounts, may be displayed.

Figure 11:
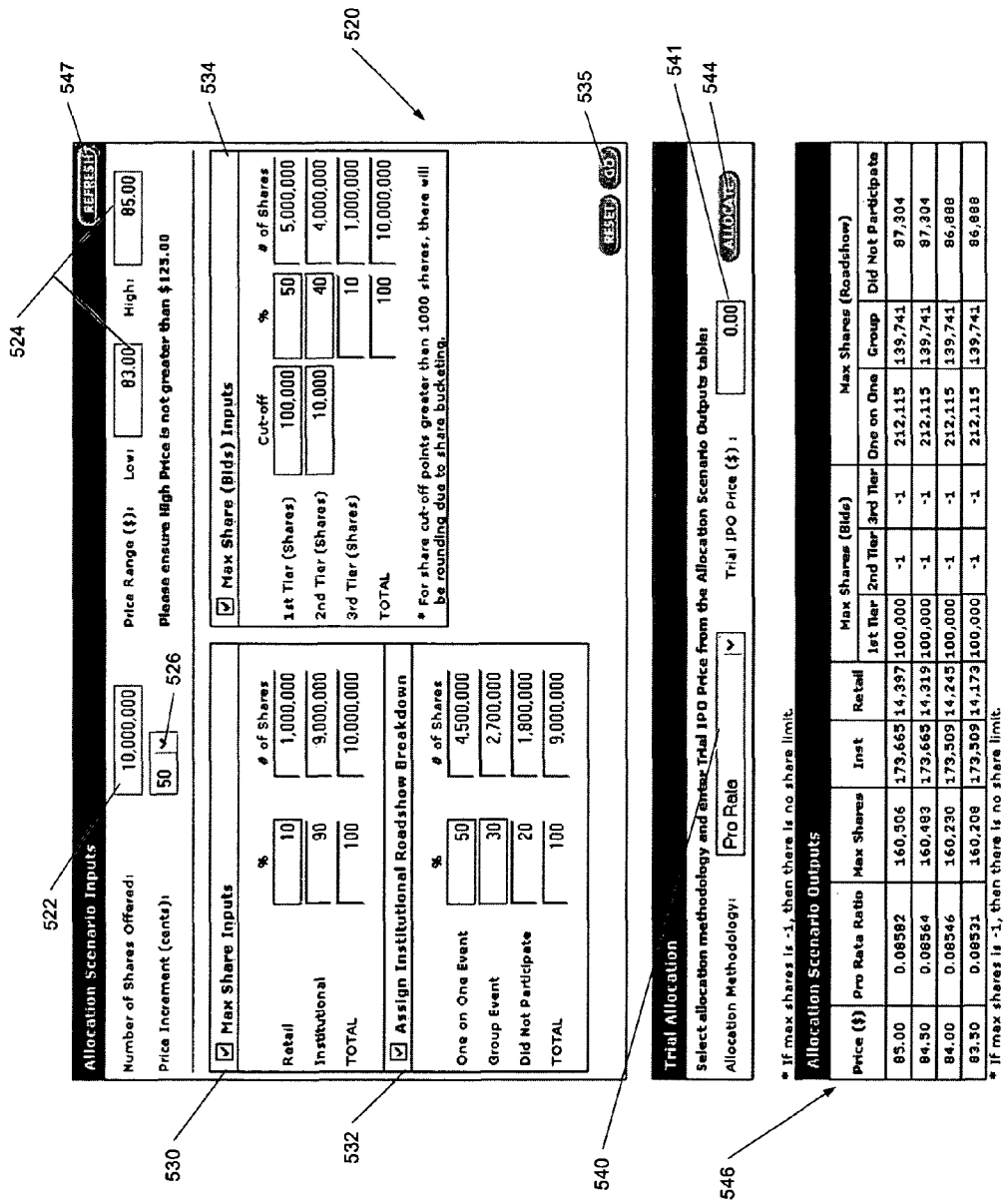

For allocation analysis, the parameters of the trial offerings may be set by the user with an interface 520 such as shown in FIG. 11, which may be displayed for the user by activating the link 514 on the menu 500 of the interface of FIG. 9. The interface 520 may include a field 522, where the user may enter the number of shares to be offered in the trial. In a field 524, the user may select an offering price range at which the trial allocations will be generated, with the price increment between the low and high prices of the range set at field 526. In field blocks 530, 532, 534, the user may select various allocation parameters if desired in the user's analysis. For example, in field block 530, the user may specify an allocation between different types of investors (e.g., retail and institutional). In this example, the user has selected a 10%-90% split in the allocation between retail and institutional investors. In field block 532, the user may, for example, further refine the allocation to institutional investors based on their roadshow participation. In field block 534, the user may tier (segment) the investor population by the cumulative number of shares they bid for. Two cutoffs are used in this example to define three tiers. For each tier, the user may then define the percentage of the total number of shares offered that should be assigned to each tier. If one tier is given a proportionally larger number of shares, then it is a way of increasing the max share value for that tier. Upon clicking the "GO" button 535, the max share module 138 would then calculate three max share values, one for each tier. The results from the analysis may be displayed in the table 546 at the bottom of the page when the "REFRESH" button 547 is activated.

In addition, after review of the results over the desired price range, the user can set a trial IPO price, at field 541, for a selected allocation approach, chosen from a drop-down window 540. For example, the user may choose whether a max shares allocation approach is used (as shown in the example of FIG. 11) or whether a pro rata approach is used. In other embodiments, the user may also select other possible options, such as max shares for institutional investors and pro rata for retail, and vice versa. By clicking on or otherwise activating the "ALLOCATE" icon 544, the allocation module 134 computes the allocations for the trial based on the inputs and parameters specified by the user.

The user may, of course, choose not to use the allocation options allowed by the field blocks 530, 532, 534 in the trials, or use only some of them. In other embodiments, different allocation refinement options may be available to the user.

Figure 12:
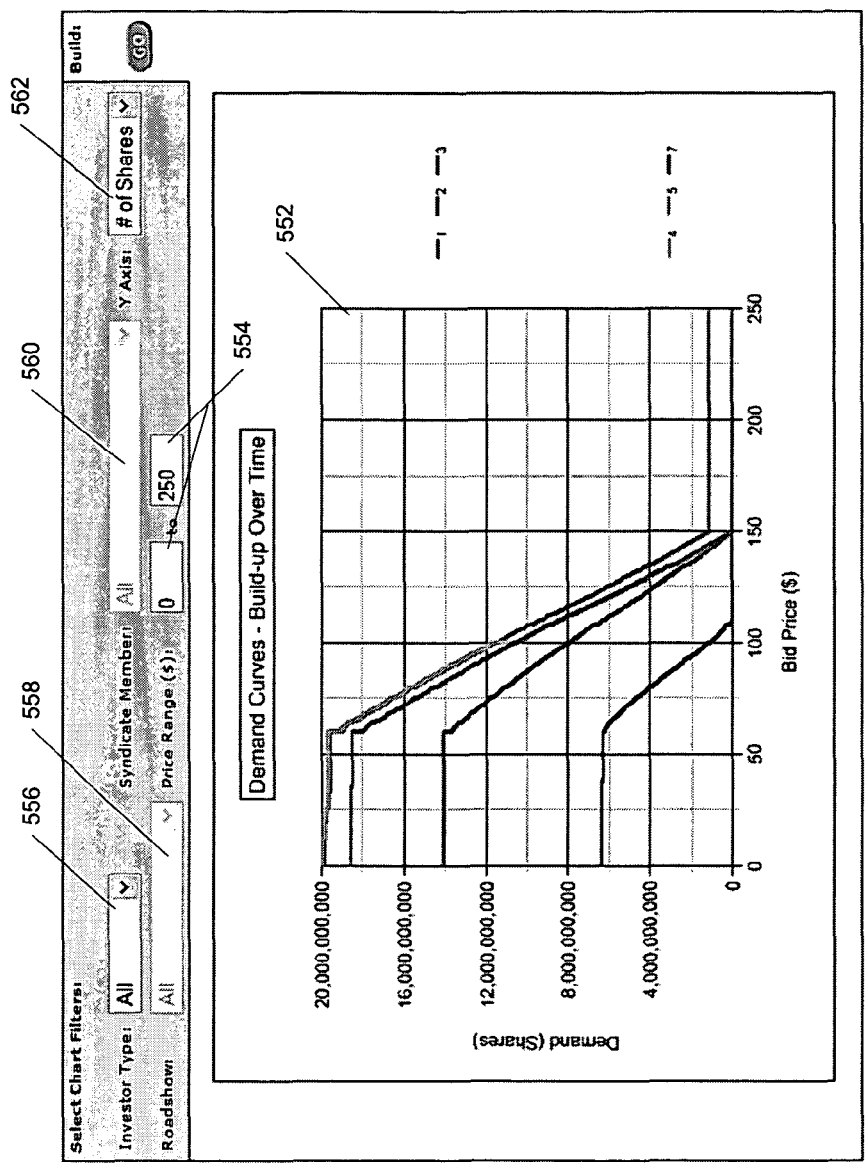

Returning to FIG. 9, the analytics menu 500 may also contain a number of options for analyzing the demand for the offered shares. For example, the analytics menu may contain a hyperlink 550 that allows the user to see the demand build up over time (e.g., sweep job) over the course of the auction in a graph, such as the graph 552 shown in FIG. 12. The user may select the price range for the graph from drop-down windows 554, or, in other embodiments, the user may be able to input a specific price range. Also, in drop-down windows 556, 558, 560, 562, the user may, for example, specify attributes of the investors for which the demand buildup is to be displayed. For example, in field 556 the user may select the investor type; in field 558 the user may select the roadshow participation attribute of the investors; in field 560 the user may select the syndicate member(s); and in field 562 the user may select the parameter for the y-axis in the graph. (In this example, the y-axis shows the number of shares; other options for the y-axis include the number of bids, for example). Once the user populates the fields with the desired attributes, the user may activate the "GO" icon 563 to request the analysis.

Figure 13:
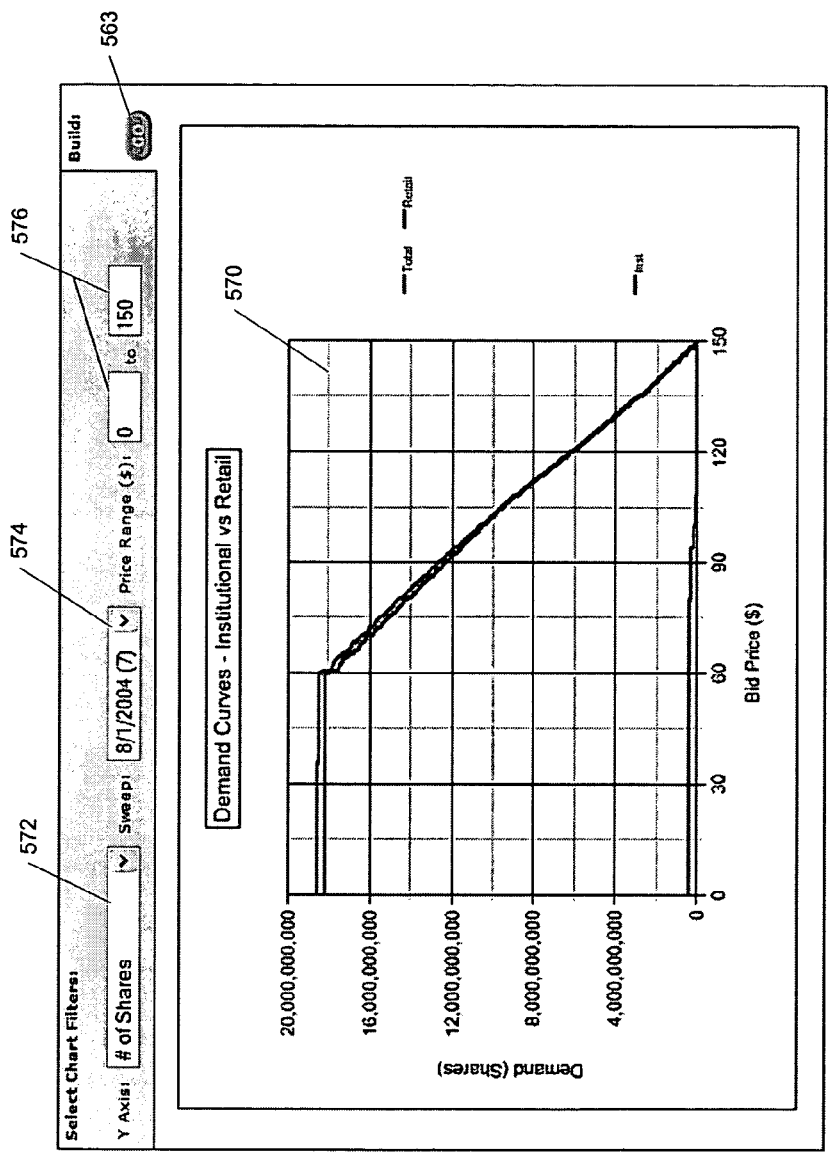
Figure 14:
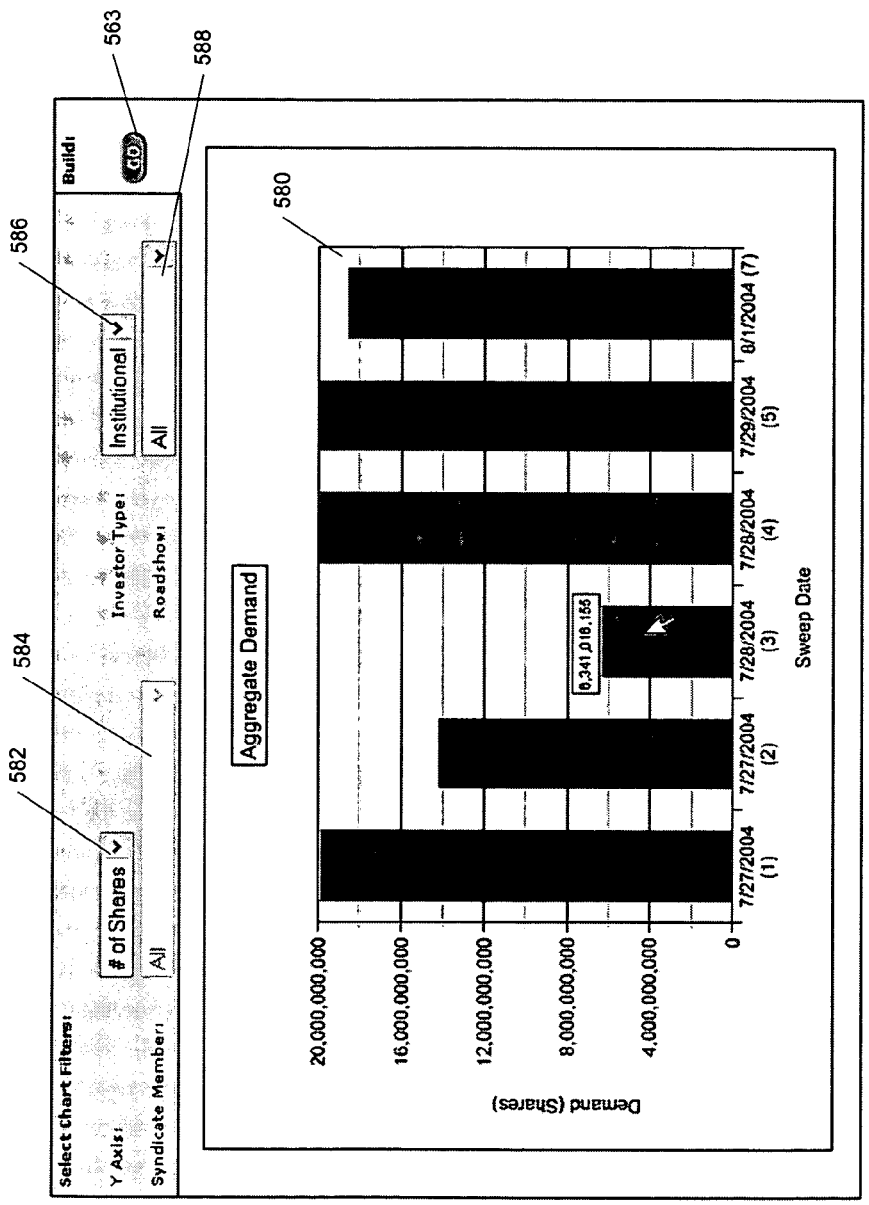

Also, returning to FIG. 9, the analytics menu may contain a link 511 for showing the demand breakdown by investor type or syndicate member. An example of the graphical output available when activating this link is shown in graph 570 of FIG. 13. In field 572 the user may specify the y-axis parameter; in field 574 the user may specify the sweep job; and in field 576 the user may specify the price range for the analysis. For the example of FIG. 13, the y-axis is selected to be number of shares, although other options may include number of bids and percent of offered shares. Selection of "percent of offered shares" provides a clearing price curve. Also, as shown in FIG. 14, a chart 580 showing the aggregate demand by sweep date may be displayed to the user. This chart may be displayed by activating the "Aggregate Demand" link 509 in the menu 500 of FIG. 9, and the chart 580 may show the maximum number of shares bid for by all investors by sweep job. In field 582 the user may specify the y-axis parameter (number of shares in this example; could also be number of bids); in field 584 the user may specify the syndicate member(s); in field 586 the user may specify the investor type; and in field 588 the user may specify the roadshow participation value for the analysis.

The interface of FIG. 9 may also include a link 512 for showing the share demand by price. An example of a chart display 600 showing such a breakdown by price is shown in FIG. 16. Such a chart 600 enables the user to identify the breakdown at each price point and according to various groups of investors. At field 602, the user may specify the sweep job; at fields 604, 606 the user may specify the price range; and at field 608 the user may specify the price increment. The price increment options may be, for example, 100 cents, 50 cents, 25 cents, 20 cents, 10 cents, 5 cents and 1 cent.

Figure 15:
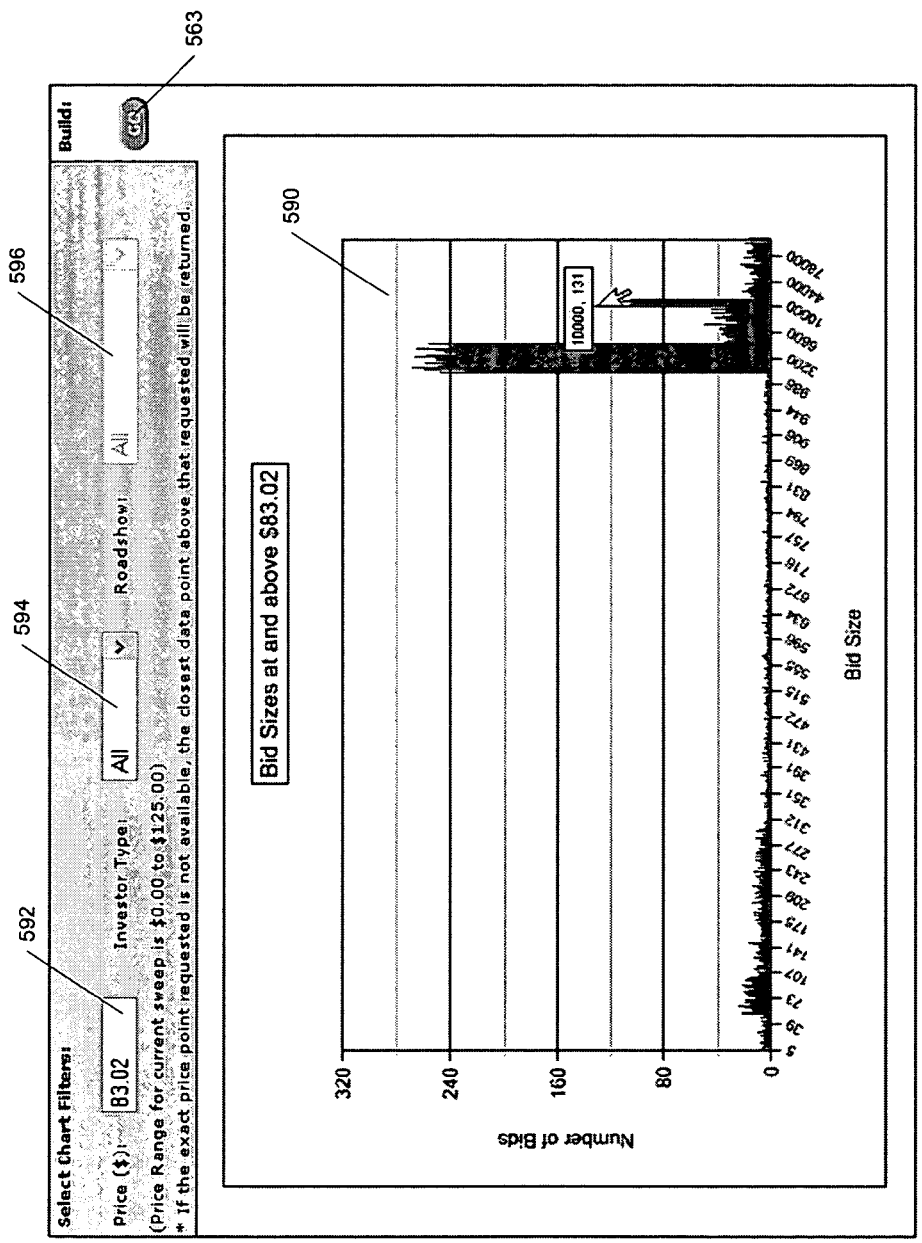

Returning to FIG. 9, the analytics menu 500 may also include a link 513 to analyze the number of bids as a function of bid size for a particular price. A graph 590 showing the number of bids as a function of bid size for an exemplary offering is shown in FIG. 15. In field 592 the user may specify the price for the analysis; in field 594 the user may specify the investor type; and in field 596 the user may specify the roadshow participation value.

Other analytics options may be provided, although not shown in the analytics menu 500 of FIG. 9. Such other analytics options include, for example, a breakdown by investor, which may provide the demand breakdown by investor group and/or syndicate member for a particular price.

The analytics menu 500 may also include, for example, a hyperlink 515 for allowing the user to view the allocation analysis based on price, as shown in the sample output chart 610 of FIG. 17, and a hyperlink 516 that allows the user to set the criteria for the M&D bids.

In other applications, instead of being used for security offerings, the auction management system 10 described above could be used for security buy-backs. A buy-back is where an issuer of securities buys back outstanding shares so as to reduce the number of shares of the security outstanding. In such an application, the auction management system 10 may analyze offering bids from holders of the security to be bought back. The auction management system 10, in such an application, may be located at a site of the issuer (i.e., the entity buying back the securities).

According to yet other embodiments, bidders, either instead of or in addition to submitting bids through syndicate members, may submit bids directly to the auction management system 10, such as via a web-based system. For example, a prospective bidder could log onto a designated web site and submit a bid, as is known in conventional on-line auction sites. The auction management system 10 may compile and analyze the bids as described above. Such a web-based bidding system may also be used in buy-back applications.

While several embodiments of the invention have been described, it should be apparent, however, that various modifications, alterations and adaptations to those embodiments may occur to persons skilled in the art with the attainment of some or all of the advantages of the present invention. For example, various steps of the processes described herein may be performed in separate orders. It is therefore intended to cover all such modifications, alterations and adaptations without departing from the scope and spirit of the present invention as defined by the appended claims.

What is claimed is:

1. An auction management system for an auction of securities, comprising:
at least one processor programmed to execute software instructions to:
receive a plurality of security auction bid files, each security auction bid file associated with one of a plurality of entities that receive a plurality of bids collectively from a plurality of bidders participating in the auction of securities, wherein there are bid data attributes for each bid of the plurality of bids, wherein each of the entities has an entity identifier that individually identifies each of the plurality of entities that receives the one or more bids of the plurality of bids from the plurality of bidders, and wherein each of the security auction bid files contains bid data comprising, for each bidder of the plurality of bidders having at least one bid of the plurality of bids in the security auction bid file, one or more bids of the plurality of bids for the auction of securities and, for each of the one or more bids, a bidder identifier that is unique to the bidder and independent of the entity that receives the one or more bids, such that the bidder identifier identifies the bidder placing the one or more bids of the plurality of bids for the auction;
segment the bid data from the plurality of security auction bid files originated from each entity of the plurality of entities into a plurality of data segments for each entity of the plurality of entities using a segmenting algorithm that is based on the bidder identifier of each bidder of the plurality of bidders such that all bid data from an entity corresponding to a particular bidder of the plurality of bidders are put into the same data segment for the entity of the plurality of entities, wherein there are a plurality of data segment groups and each of the plurality of data segments is assigned to a corresponding data segment group, wherein each data segment group comprises one or more of the plurality of data segments for each of the plurality of entities such that each data segment group contains all bid data corresponding to a range of bidder identifiers regardless of which of the plurality of entities originated the bid data, and wherein, for each single bidder of the plurality of bidders that submits one or more bids through multiple entities of the plurality of entities, all bid data for the single bidder are assigned to the same data segment group irrespective of the multiple entities that originated the security auction bid files of the plurality of security auction bid files for the single bidder;
perform a first-level data aggregation in the plurality of data segment groups according to at least one bid data attribute combination of the bid data attributes of the plurality of bids to generate first-level aggregation data corresponding to each of the data segment groups of the plurality of data segment groups;

perform a second-level data aggregation across each of the first-level aggregation data for the at least one bid data attribute combination to generate second-level aggregation data that includes aggregate bid data across all of the data segment groups for the at least one bid data attribute combination;

determine an aggregate number of bidders of the plurality of bidders at a plurality of bid price increments, wherein each bidder of the plurality of bidders is counted at every bid price increment up to a highest bid price for each bidder; and determine aggregate price demand curve data for two or more of the plurality of bidders based on the second-level aggregation data and the aggregate number of bidders of the plurality of bidders at a plurality of bid price increments, where the aggregate demand curve data comprises data indicative of a quantity of the securities demanded by the two or more of the plurality of bidders at each of the plurality of bid price increments.

2. The auction management system of claim 1, wherein the bidder identifier is one of a bidder's tax identification number (TIN), a bidder's social security number (SSN), a bidder's passport number, and a bidder's assigned ID code.

3. The auction management system of claim 1, wherein at least one of the bidder identifiers comprises a combination of data in the bid file.

4. The auction management system of claim 3, wherein the at least one of the bidder identifiers is a combination of an issuing country code and one of the bidder's TID, the bidder's SSN, and the bidder's passport number.

5. The auction management system of claim 1, wherein the at least one processor is programmed to segment the bid data based on a derivation of each bidder identifier.

6. The auction management system of claim 5, wherein the derivation of each bidder identifier comprises one of: a truncation of the bidder identifier, a summing result of the bidder identifier, a result of a modular operation on a binary representation of the bidder identifier, a result of a hash on the bidder identifier, and a string of one or more digits from the bidder identifier.

7. The auction management system of claim 5, wherein the at least one processor segments the bid data based on the derivation of each bidder identifier by using a look-up function.

8. The auction management system of claim 1, wherein each of the plurality of data segments comprises a mini-order book file corresponding to a subset of the plurality of bidders associated with one of the plurality of security auction bid files, and the at least one processor generates a plurality of mini-order book files for each plurality of security auction bid files.

9. The auction management system of claim 8, wherein the at least one processor groups together into separate data stripes, corresponding mini-order book files produced by the data segmentation, wherein corresponding mini-order book files contain bid data across a common range of bidders.

10. The auction management system of claim 9, wherein each data stripe contains all bid data corresponding to a same range of bidder identifiers regardless of which of the plurality of entities supplied the bid files containing the bid data.

11. The auction management system of claim 9, wherein the at least one processor analyzes the bid data from each data stripe to detect and invalidate duplicative bids in the plurality of bids.

12. The auction management system of claim 1, wherein the bid data of the plurality of bid files further comprise a bid quantity and a bid price.

13. The auction management system of claim 1, wherein the bid data of the plurality of bid files further comprise at least one of an indication of quantity and a yield.

14. The auction management system of claim 1, wherein the at least one processor adds data to various fields of the plurality of bid files during processing.

15. The auction management system of claim 1, further comprising an aggregations data store for storing the second-level aggregation data that is in communication with one or more of the at least one processor.

16. The auction management system of claim 15, wherein the at least one processor comprises a file transfer system, a data striper system, a bid aggregation system, and an analytics system.

17. The auction management system of claim 16, wherein the bid aggregation system comprises a plurality of processors acting in parallel.

18. The auction management system of claim 1, wherein the at least one processor analyzes each of the data segment groups to detect duplicative bids in the plurality of bids.

19. The auction management system of claim 18, wherein the at least one processor comprises a file transfer system, a data striper system, a bid aggregation system, an analytics system, and a de-duplication system.

20. The auction management system of claim 1, wherein each data segment group comprises a plurality of the data segments, each corresponding to a different one of the plurality of entities.

21. The auction management system of claim 1, wherein the first-level data aggregation is performed in each of the plurality of data segment groups according to a plurality of bid data attribute combinations to generate a plurality of first-level aggregation data files, each corresponding to one of the plurality of bid data attribute combinations.

22. The auction management system of claim 21, wherein the at least one processor comprises a bid aggregation system that includes a separate processor or group of processors that processes each of the plurality of data segment groups.

23. The auction management system of claim 22, wherein the at least one processor further comprises a bid striper that performs the bid data segmentation and that includes a plurality of processors.

24. The auction management system of claim 1, wherein the first-level aggregation data corresponds to demand curve data for each of the at least one bid data attribute combination.

25. The auction management system of claim 1, wherein the at least one bid data attribute combination comprises a combination of bid price level and at least one other bid data attribute.

26. The auction management system of claim 25, wherein the at least one other bid data attribute is at least one of syndicate member, roadshow participation, and investor type.

27. The auction management system of claim 1, wherein the first-level aggregation data comprise, for each data segment group and bid data attribute combination, data aggregated from the data segment group, and comprising one or more of aggregated number of bidders data, aggregated number of shares data, minimum bid data, and maximum bid data.

28. The auction management system of claim 27, wherein the second-level aggregation data comprises, for each bid data attribute combination, data aggregated from the first-level aggregation data, and comprising one or more of aggregated number of bidders data, aggregated number of shares data, minimum bid data, and maximum bid data.

29. The auction management system of claim 28, wherein the second-level aggregation data comprises a plurality of second-level aggregation data files, and each of the second-level aggregation data files corresponds to a different bid data attribute combination, and wherein the first-level data aggregation data comprises a plurality of first-level aggregation data files, and each of the first-level aggregation data files corresponds to a different bid data attribute combination and one of the plurality of entities.

30. The auction management system of claim 1, wherein the at least one processor performs at least a third-level data aggregation for at least some of the bid data.

31. The auction management system of claim 1, wherein the at least one processor comprises an analytics system that generates analytics for users based on at least the second-level aggregation data.

32. The auction management system of claim 31, further comprising a host computer system in communication with the analytics system, wherein the host computer system generates web pages based on the analytics generated by the analytics system.

33. The auction management system of claim 32, wherein the host computer system receives input parameters to the analytics systems from the users, and returns output data from the analytics system to the users.

34. The auction management system of claim 33, wherein the input parameters comprise selected attribute parameters.

35. The auction management system of claim 31, wherein the analytics system comprises a price demand module that generates the aggregate price demand curve data based on a determination of an aggregate number of shares bid by the plurality of bidders at the plurality of bid price increments.

36. The auction management system of claim 31, wherein the analytics system comprises an investor computation module that determines the aggregate number of bidders of the plurality of bidders at the plurality of bid price increments.

37. The auction management system of claim 31, wherein the analytics system comprises a share size demand module that determines, for each of one or more bid prices, a number of bidders that requested each of a plurality of share lot sizes.

38. The auction management system of claim 31, wherein the analytics system comprises a share size demand module that generates histogram data at each of a plurality of price increments, wherein the histogram data indicates a number of bidders that requested each of a plurality of share lot sizes.

39. The auction management system of claim 31, wherein for purposes of the data aggregations, at least some of the aggregation data is determined based on bucketizing the bid data.

40. The auction management system of claim 39, wherein for purposes of the data aggregations, bid size is bucketized into bid size lots.

41. The auction management system of claim 31, wherein the analytics system comprises an allocation module to determine trial allocations to one or more bidders based on user specified offering price, supply and allocation approach.

42. The auction management system of claim 31, wherein the analytics system comprises an allocation module to determine allocations to one or more winning bidders of the plurality of bidders of offered securities for a given offering price and supply.

43. The auction management system of claim 42, wherein the allocation module further determines the allocation based on an allocation approach user input.

44. The auction management system of claim 43, wherein the allocation module further determines an allocation for each account of a bidder of the plurality of bidders when the bidder of the plurality of bidders submits bids though more than one account.

45. The auction management system of claim 31, wherein the analytics system comprises a manipulative and disruptive bid detection module to detect potentially manipulative or disruptive bids.

46. The auction management system of claim 31, wherein the analytics system comprises an investor computation module to determine an aggregate number of bidders for each price point of a plurality of bid prices to determine the number of bidders per price bid by counting a bidder once at every price point up to a highest bid submitted by the bidder.

47. The auction management system of claim 31, wherein the analytics system comprises a maximum exposure model to determine the maximum exposure of at least one bidder that submits a bid.

48. The auction management system of claim 1, wherein the plurality of bids collectively from the plurality of bidders comprise a plurality of bids for an offering of securities selected from a group consisting of equity securities and debt securities.

49. A computer-implemented securities auction management method for an auction of securities, comprising:
receiving a plurality of security auction bid files, each security auction bid file associated with one of a plurality of entities that receive a plurality of bids collectively from a plurality of bidders for the auction of securities, wherein there are bid data attributes for each of the plurality of bids, wherein each of the entities has an entity identifier that individually identifies each of the plurality of entities that receives one or more of the plurality of bids from the plurality of bidders, and wherein each of the security auction bid files contains bid data comprising, for each bidder of the plurality of bidders having at least one bid of the plurality of bids in the security auction bid file, one or more bids of the plurality of bids for the auction of securities and, for each of the one or more bids, a bidder identifier that is unique to the bidder and independent of the entity that receives the one or more bids, such that the bidder identifier identifies the bidder placing the one or more bids of the plurality of bids for the auction and wherein the plurality of security auction bid files are received by at least one processor via a communications link;
segmenting, by the at least one processor, the bid data from the plurality of security auction bid files originated from each entity of the plurality of entities into a plurality of data segments for each entity using a segmenting algorithm that is based on the bidder identifier of each bidder of the plurality of bidders, such that all bid data from an entity corresponding to a particular bidder of the plurality of bidders are put into the same data segment for the entity of the plurality of entities, wherein there are a plurality of data segment groups and each of the plurality of data segments is assigned to a corresponding data segment group, wherein each data segment group comprises one or more of the plurality of data segments such that each data segment group contains all bid data corresponding to a range of bidder identifiers regardless of which of the plurality of entities originated the bid data, and wherein, for each single bidder of the plurality of bidders that submits one or more bids of the plurality of bids through multiple entities of the plurality of entities, all bid data for the single bidder are assigned to the same data segment group irrespective of the multiple entities of the plurality of entities that originated the bid files of the plurality of security auction bid files for the single bidder; and performing, by the at least one processor, a first-level data aggregation in the plurality of data segment groups according to at least one bid data attribute combination of the bid data attributes of the plurality of bids to generate first-level aggregation data corresponding to each of the data segment groups of the plurality of data segment groups; and performing, by the at least one processor, a second-level data aggregation across each of the first-level aggregation data for the at least one bid data attribute combination to generate second-level aggregation data that includes aggregate bid data across all of the data segment groups for the at least one bid data attribute combination;

determining, by the at least one processor, an aggregate number of bidders of the plurality of bidders at a plurality of bid price increments, wherein each bidder of the plurality of bidders is counted at every bid price increment up to a highest bid price for each bidder; and determining, by the at least one processor, aggregate price demand curve data for two or more of the plurality of bidders based on the second-level aggregation data and the aggregate number of bidders of the plurality of bidders at a plurality of bid price increments, where the aggregate demand curve data comprises data indicative of a quantity of the securities demanded by the two or more of the plurality of bidders at each of the plurality of bid price increments.

50. The method of claim 49, wherein the bidder identifier is one a bidder's tax identification number (TID), a bidder's social security number (SSN), a bidder's passport number, and a bidder's assigned ID code.

51. The method of claim 49, wherein at least one of the bidder identifiers comprises a combination of data in the bidder file.

52. The method of claim 51, wherein the at least one of the bidder identifiers is a combination of an issuing country code and one of the bidder's TID, the bidder's SSN, and the bidder's passport number.

53. The method of claim 49, wherein segmenting the bid data based on each bidder identifier comprises segmenting the bid data based on a derivation of each bidder identifier.

54. The method of claim 53, wherein the derivation of each bidder identifier comprises one of: a truncation of the bidder identifier, a summing result of the bidder identifier, a result of a modular operation on a binary representation of the bidder identifier, a result of a hash on the bidder identifier, and a string of one or more digits from the bidder identifier.

55. The method of claim 49, wherein segmenting the bid data based on each bidder identifier further comprises segmenting the bid data based on each bidder identifier using a look-up function.

56. The method of claim 49, wherein each of the plurality of data segments comprises a mini-order book file corresponding to a subset of the bidders associated with one of the bid files, and further comprising generating, by the at least one processor, a plurality of mini-order book files for each bid file.

57. The method of claim 56 further comprising grouping together into separate data stripes, by the at least one processor, corresponding mini-order book files produced by the data segmentation, wherein corresponding mini-order book files contain bid data across a common range of bidders.

58. The method of claim 57, wherein each data stripe contains all bid data corresponding to a same range of bidder identifiers regardless of which of the plurality of entities supplied the bid files containing the bid data.

59. The method of claim 58, further comprising analyzing, by the at least one processor, the bid data from each data stripe to detect and invalidate duplicative bids.

60. The method of claim 49, wherein the bid data of the bid files further comprise a bid quantity and a bid price.

61. The method of claim 49, wherein the bid data of the bid files further comprise at least one of an indication of quantity and a yield.

62. The method of claim 49, further comprising adding, by the at least one processor, data to various fields of the bid files during processing.

63. The method of claim 49, wherein the aggregations data store is in communication with one or more of the at least one processor.

64. The method of claim 63, wherein the at least one processor comprises a file transfer system, a data striper system, a bid aggregation system, and an analytics system.

65. The method of claim 64, wherein the bid aggregation system comprises a plurality of processors acting in parallel.

66. The method of claim 49, further comprising analyzing, by the at least one processor, each of the plurality of data segment groups to detect duplicative bids.

67. The method of claim 66, wherein the at least one processor comprises a file transfer system, a data striper system, a bid aggregation system, an analytics system, and a de-duplication system.

68. The method of claim 49, wherein each data segment group comprises a plurality of the plurality of data segments, each corresponding to a different one of the plurality of entities.

69. The method of claim 49, further comprising performing the first-level data aggregation in each of the data segment groups according to a plurality of bid data attribute combinations to generate a plurality of first-level aggregation data files, each corresponding to one of the bid data attribute combinations.

70. The method of claim 69, wherein the at least one processor comprises a bid aggregation system that includes a separate processor or group of processors that processes each of the plurality of data segment groups.

71. The method of claim 70, wherein the at least one processor further comprises a bid striper that performs the bid data segmentation and that includes a plurality of processors.

72. The method of claim 49, wherein the first-level aggregation data corresponds to demand curve data for each of the at least one bid data attribute combination.

73. The method of claim 49, wherein the at least one bid data attribute combination comprises a combination of bid price level and at least one other bid data attribute.

74. The method of claim 73, wherein the at least one other bid data attribute is at least one of syndicate member, roadshow participation, and investor type.

75. The method of claim 49, wherein the first-level aggregation data comprise, for each data segment group and bid data attribute combination, data aggregated from the corresponding data segment group, and comprising one or more of aggregated number of bidders data, aggregated number of shares data, minimum bid data, and maximum bid data.

76. The method of claim 75, wherein the second-level aggregation data comprises, for each bid data attribute combination, data aggregated from each of the corresponding first-level aggregation data, and comprising one or more of aggregated number of bidders data, aggregated number of shares data, minimum bid data, and maximum bid data.

77. The method of claim 76, wherein the second-level aggregation data comprises a plurality of second-level aggregation data files, and each of the second-level aggregation data files corresponds to a different bid data attribute combination, and wherein the first-level data aggregation data comprises a plurality of first-level aggregation data files, and each of the first-level aggregation data files corresponds to a different bid data attribute combination and one of the plurality of entities.

78. The method of claim 49, further comprising performing, by the at least one processor, at least a third-level data aggregation for at least some of the bid data.

79. The method of claim 49, wherein the at least one processor comprises an analytics system and further comprising generating, by the analytics system, analytics for users based on at least the second-level aggregation data.

80. The method of claim 79, wherein a host computer system is in communication with the analytics system and further comprising generating, by the host computer system, web pages based on the analytics generated by the analytics system.

81. The method of claim 80, further comprising receiving, by the host computer system, input parameters to the analytics systems from the users, and returning output data from the analytics system to the users.

82. The method of claim 81, wherein the input parameters comprise selected attribute parameters.

83. The method of claim 79, wherein the analytics system comprises a price demand module that generates the aggregate price demand curve data based on determining an aggregate number of shares bid by the bidders at the plurality of bid price increments.

84. The method of claim 79, wherein the analytics system comprises an investor computation module that determines the aggregate number of bidders at the plurality of bid price increments.

85. The method of claim 79, wherein the analytics system comprises a share size demand module and further comprising determining, by the share size demand module, for each of one or more bid prices, a number of bidders that requested each of a plurality of share lot sizes.

86. The method of claim 79, wherein the analytics system comprises a share size demand module and further comprising generating, by the share size demand module, histogram data at each of a plurality of price increments, wherein the histogram data indicates a number of bidders that requested each of a plurality of share lot sizes.

87. The method of claim 79, wherein for purposes of the data aggregations, at least some of the aggregation data is determined based on bucketizing the bid data.

88. The method of claim 87, wherein for purposes of the data aggregations, bid size is bucketized into bid size lots.

89. The method of claim 79, wherein the analytics system comprises an allocation module and further comprising determining, by the allocation module, trial allocations to one or more bidders based on user specified offering price, supply and allocation approach.

90. The method of claim 79, wherein the analytics system comprises an allocation module and further comprising determining, by the allocation module, allocations to one or more winning bidders of offered securities for a given offering price and supply.

91. The method of claim 90, further comprising determining, by the allocation module, the allocation based on an allocation approach user input.

92. The method of claim 91, further comprising determining, by the allocation module, an allocation for each account of a bidder of the plurality of bidders when the bidder submits bids of the plurality of bids though more than one account.

93. The method of claim 79, wherein the analytics system comprises a manipulative and disruptive bid detection module and further comprising detecting, by the manipulative and disruptive bid detection module, potentially manipulative or disruptive.

94. The method of claim 79, wherein the analytics system comprises an investor computation module and further comprising determining, by the investor computation module, an aggregate number of bidders for each price point of a plurality of bid prices to determine the number of bidders per price bid by counting a bidder once at every price point up to the highest bid submitted by the bidder.

95. The method of claim 79, wherein the analytics system comprises a maximum exposure model and further comprising determining, by the maximum exposure module, the maximum exposure of at least one bidder that submits a bid.

96. The method of claim 49, wherein the plurality of bids collectively from the plurality of bidders comprise a plurality of bids for an offering of securities selected from the group consisting of equity securities and debt securities.

\* \* \* \* \*